(12) United States Patent
Ko et al.

(10) Patent No.: US 11,745,466 B2
(45) Date of Patent: Sep. 5, 2023

(54) SILVER NANOWIRE FILM AND MANUFACTURING METHOD THEREFORE, AND TOUCH SCREEN PANEL AND MANUFACTURING METHOD THEREFOR

(71) Applicants: UNIST(ULSAN NATIONAL INSTITUTE OF SCIENCE AND TECHNOLOGY), Ulsan (KR); DUKE UNIVERSITY, Durham, NC (US)

(72) Inventors: Hyunhyub Ko, Ulsan (KR); Seungse Cho, Ulsan (KR); Saewon Kang, Ulsan (KR); Stephen L. Craig, Chapel Hill, NC (US)

(73) Assignees: UNIST(ULSAN NATIONAL INSTITUTE OF SCIENCE AND TECHNOLOGY), Ulsan (KR); DUKE UNIVERSITY, Durham, NC (US)

( * ) Notice: Subject to any disclaimer, the term of this patent is extended or adjusted under 35 U.S.C. 154(b) by 0 days.

(21) Appl. No.: 17/680,518

(22) Filed: Feb. 25, 2022

(65) Prior Publication Data
US 2022/0258452 A1 Aug. 18, 2022

Related U.S. Application Data

(62) Division of application No. 16/461,806, filed as application No. PCT/KR2017/008133 on Jul. 27, 2017, now abandoned.

(30) Foreign Application Priority Data

Nov. 18, 2016 (KR) .................. 10-2016-0153803
Apr. 3, 2017 (KR) .................. 10-2017-0043130

(51) Int. Cl.
*B32B 15/02* (2006.01)
*B32B 15/01* (2006.01)
(Continued)

(52) U.S. Cl.
CPC ............. *B32B 15/02* (2013.01); *B32B 15/01* (2013.01); *G06F 3/047* (2013.01); *H01B 1/02* (2013.01);
(Continued)

(58) Field of Classification Search
CPC ......... B32B 15/02; B32B 15/01; G06F 3/047; G06F 2203/04112; G06F 3/041; H01B 1/02; H01B 5/00
See application file for complete search history.

(56) References Cited

U.S. PATENT DOCUMENTS

| | | | | |
|---|---|---|---|---|
| 2009/0052029 A1* | 2/2009 | Dai | ........................ | H01B 1/22 29/850 |
| 2009/0322700 A1* | 12/2009 | D'Souza | ................. | G06F 3/045 345/174 |
| 2019/0031820 A1* | 1/2019 | Yabu | ..................... | C08G 61/08 |

FOREIGN PATENT DOCUMENTS

| | | | | |
|---|---|---|---|---|
| KR | 20120010359 A | * | 7/2010 | |
| WO | WO-2004061640 A1 | * | 7/2004 | ............. G06F 3/045 |
| WO | WO-2009018111 A1 | * | 2/2009 | ............. C08F 110/14 |

OTHER PUBLICATIONS

Machine translation of KR20120010359A (Year: 2010).*
(Continued)

*Primary Examiner* — Patrick N Edouard
*Assistant Examiner* — Joseph P Fox
(74) *Attorney, Agent, or Firm* — LEX IP MEISTER, PLLC

(57) ABSTRACT

Disclosed is a silver nanowire film including: silver nanowires A unidirectionally aligned in a longitudinal direction; and silver nanowires B randomly aligned in the longitudinal direction, in which the silver nanowires A and the silver nanowires B each are plural and satisfy Equation 1 below.

$$[A]/([A]+[B]) > 2/3 \qquad \text{[Equation 1]}$$

(Continued)

(In Equation 1 above, [A] represents the number of silver nanowires A having an alignment degree of less than ±15° from the alignment direction, and [B] represents the number of silver nanowires B having an alignment degree of ±15° or more from the alignment direction.)

7 Claims, 29 Drawing Sheets

(51) Int. Cl.
    *H01B 1/02*     (2006.01)
    *G06F 3/047*     (2006.01)
    *H01B 5/00*     (2006.01)

(52) U.S. Cl.
    CPC ...... *G06F 2203/04112* (2013.01); *H01B 5/00* (2013.01)

(56) References Cited

OTHER PUBLICATIONS

Wang et al. (Xiao-Qiao Wang, Cai-Feng Wang, Ahen-Fang Zhou, Su Chen, Robust Mechanochromic Elastic One-Dimensional Photonic Hydrogels for Touch Sensing and Flexible Displays, Advanced Optical Materials/vol. 2, Issue /p. 652-662, hereinafter "Wang"), wileyonlinelibrary.com (Year: 2014).*

* cited by examiner

SILVER NANOWIRE FILM AND MANUFACTURING METHOD THEREFORE, AND TOUCH SCREEN PANEL AND MANUFACTURING METHOD THEREFOR

TECHNICAL FIELD

The present invention relates to a silver nanowire film and a method for manufacturing the same. Further, the present invention relates to a touch screen panel including a strength recognition layer, and more particularly, to a touch screen panel for recognizing a touch strength by combining a high-performance transparent conductive film having excellent conductivity and transparency using an aligned silver nanowire network and a mechanochromic complex polymer of which a color is changed according to the touch strength, and a method of manufacturing the same.

BACKGROUND ART

Silver nanowires have the advantage of having excellent conductivity, transparency, and flexibility at the same time. In addition, it is advantageous in that a solution-based process of the silver nanowires is easily applied to various coating processes.

Researches have been carried out to implement the silver nanowires in the form of films to be utilized in electronic devices, on the basis of the advantage. Specifically, researches based on solution processes such as spin coating, spray coating, vacuum filtration and bar coating are known.

However, the silver nanowire has a very long aspect ratio and very actively moves in a solution. Therefore, when a generally known solution process is used, a film cannot but be obtained, which has high contact resistance and high surface roughness as the silver nanowires are inevitably randomly arranged and the nanowires are unnecessarily entangled with each other, thereby making it difficult to apply silver nanowire-based transparent electrodes with a random structure to optoelectronic devices.

Therefore, the conductive network control of the silver nanowires enables a film which can overcome the limitation of electrical and optical properties and is uniform with a large area to be manufactured.

The touch screen panel is used in a scheme in which the touch screen panel recognizes a touch position when a human hand or an object touches a specific position of a screen. The structure of a general touch screen panel is constituted by a substrate, a transparent conductive film, an insulating film, and the like. Resistive type and capacitive type, which are widely used depending on an operation type, are representative.

In the case of the resistive touch panel, upper and lower transparent conductive films face each other at regular intervals through a spacer, and when a pressure due to a finger or a pen is applied, two transparent conductive films contact each other and an electric signal is generated to recognize the position.

However, the transparent conductive film in the related art has limitations in the manufacture of flexible touch screen panels due to deterioration in durability of the conductive film due to repeated and continuous pressure. In addition, the resistive touch panel has limitations in which when a touch position is recognized by touching, the strength or the force of the touch cannot be recognized, and only simple positional information is displayed.

The above information disclosed in this Background section is only for enhancement of understanding of the background of the invention and therefore it may contain information that does not form the prior art that is already known in this country to a person of ordinary skill in the art.

DISCLOSURE

Technical Problem

To address the above indicated problems, a film including silver nanowires which are regularly arranged and a method for manufacturing the same are provided as exemplary of the present invention.

In addition, the resistive touch panel in the related art which operates as described above has limitations in which when a touch position is recognized by touching, the strength or the force of the touch cannot be recognized, and only simple positional information is displayed. In addition, there is a problem in that there is a limit in applying the resistive touch panel to the manufacturing of a flexible touch screen panel due to a problem of deterioration in durability of upper and lower transparent electrodes of a sensor.

The present invention has been made in an effort to provide a flexible touch screen panel capable of simultaneously recognizing not only a touch position but also a touch strength through color change analysis by combining polymers whose color changes with respect to the contact strength externally applied.

Technical Solution

An exemplary embodiment of the present invention provides a silver nanowire film including: silver nanowires A unidirectionally aligned in a longitudinal direction; and silver nanowires B randomly aligned in the longitudinal direction, in which the silver nanowires A and the silver nanowires B each are plural and satisfy Equation 1 below.

$$[A]/([A]+[B]) > 2/3 \qquad \text{[Equation 1]}$$

In Equation 1 above, [A] represents the number of silver nanowires A having an alignment degree of less than ±15° from the alignment direction, and [B] represents the number of silver nanowires B having an alignment degree of ±15° or more from the alignment direction.

The silver nanowire film is a laminate form in which two or more layers may be laminated.

In adjacent layers in the silver nanowire film in which two or more layers are laminated, alignment directions of the silver nanowires A may be vertical to each other.

An area of the silver nanowire film may be in the range of 1 cm$^2$ to 1000 cm$^2$.

Light transmittance of the silver nanowire film may be 88.0% or more.

Sheet resistance of the silver nanowire film may be 45 $\Omega$sq$^{-1}$ or less (however, excluding 0 $\Omega$sq$^{-1}$).

The silver nanowire film may show maximum light absorbance in a wavelength region of 360 nm to 364 nm during polarization irradiation.

The silver nanowire film may have a full width at half maximum (FWHM) of 20 to 40.

In the silver nanowire film, as a polarization angle in the range of 0° to 90° increases, the maximum absorbance value may increase.

In the silver nanowire film, as the polarization angle in the range of 0° to 90° increases, the absorbance value may decrease in a wavelength region of more than 500 nm.

Another exemplary embodiment of the present invention provides a method for a silver nanowire film, including:

locating a rod wound with metal in a coil shape to be spaced apart from one surface of the sustrate; distributing the dispersion containing silver nanowires and a solvent between the substrate and the rod; moving the substrate and the rod relatively horizontally to coat a dispersion on one surface of the substrate; and drying the dispersion to obtain the silver nanowire film on one surface of the substrate, in which in the moving of the substrate and the rod relatively horizontally to coat the dispersion on one surface of the substrate, longitudinal directions of the silver nanowires in the dispersion are aligned in the horizontal movement direction.

In the distributing of the dispersion containing silver nanowires and the solvent between the substrate and the rod, a meniscus contact line may be formed, in which the surface of the dispersion and the metal wound on the rod contact each other.

In the moving of the substrate and the rod relatively horizontally to coat the dispersion on one surface of the substrate, the meniscus contact line may horizontally move in the horizontal movement direction.

Longitudinal directions of the silver nanowires in the dispersion may be aligned with the horizontal movement of the meniscus contact line.

The method may further include: after the drying of the dispersion to obtain the silver nanowire film on one surface of the substrate, locating a rod wound with metal in a coil shape to be spaced apart from one surface of the silver nanowire film; distributing the dispersion containing silver nanowires and a solvent between the silver nanowire film and the rod; moving the silver nanowire film and the rod relatively horizontally to coat the dispersion on one surface of the silver nanowire film; and drying the dispersion to obtain a laminate of the silver nanowire film.

A relative movement direction in the moving of the substrate and the rod relatively horizontally to coat the dispersion on one surface of the substrate, and a relative horizontal direction in the moving of the silver nanowire film and the rod relatively horizontally to coat the dispersion on one surface of the silver nanowire film may be vertical to each other.

In the locating of the rod wound with the metal in the coil shape to be spaced apart from one surface of the substrate, an interval between the substrate and the rod may be in the range of 20 μm to 120 μm. The method may further include, before the distributing of the dispersion containing silver nanowires and the solvent between the substrate and the rod, locating a separator between the substrate and the rod.

In the moving of the substrate and the rod relatively horizontally to coat the dispersion on one surface of the substrate, the relative horizontal movement speed may be in the range of 10 mm s$^{-1}$ to 80 mm s$^{-1}$. In the moving of the substrate and the rod relatively horizontally to coat the dispersion on one surface of the substrate, a temperature of the substrate may be in the range of 20° C. to 100° C.

A coil interval of the metal wound on the rod may be in the range of 50 μm to 400 μm.

Viscosity of the dispersion may be in the range of 1 cP to 10 cP.

The substrate may be made of glass, silicon, polyethylene terephthalate (PET), or a combination thereof.

In the substrate, a functional group, such as amine, methyl, hydroxyl, or a combination thereof, may be present on the side where the silver nanowire film is located.

Yet another exemplary embodiment of the present invention provides a touch screen panel including: a location recognition layer including silver nanowires which are cross-aligned and recognizes a contact location through a voltage change; and a strength recognition layer laminated on the top of the location recognition layer to contact the outside and including a composite molecule in which mechanochromic molecules and polydimethylsiloxane (PDMS) molecules are coupled to each other to recognize a contact strength through a change of a color.

The location recognition layer may include a first laminate recognizing a contact location of a horizontal axis, a spacer connected along a rim of an upper surface of the first laminate to provide a central region partitioned by the rim, and a second laminate connected to the first laminate through the spacer and spaced apart from the central region and recognizing the contact location of a vertical axis.

A pair of horizontal electrodes may be connected to the rim of the horizontal axis of the upper surface of the first laminate and a pair of vertical electrodes may be connected to formed on the rim of a vertical axis of the lower surface of the second laminate, and the spacer may include a horizontal section located between the horizontal electrode and the second laminate, and a vertical section located between the vertical electrode and the first laminate.

A height from the upper surface of the first laminate to the upper surface of the horizontal section may be equal to the height from the lower surface of the second laminate to the lower surface of the vertical section.

The first laminate may include a first film in which a plurality of silver nanowires is arranged in a direction corresponding to the horizontal axis, and a second film laminated in the vertical direction with the first film, in which the plurality of silver nanowires is arranged in a direction corresponding to the vertical axis and intersects with the silver nanowires of the first film.

Each of the plurality of silver nanowires may have a longitudinal direction, and the alignment degrees of the first film and the second film may be defined by Equation 2 below and may be ⅔ or more.

$$\text{Alignment degree} = [A]/([A]+[B]) \qquad \text{[Equation 2]}$$

([A] represents the number of silver nanowires whose longitudinal direction and arrangement direction show a difference therebetween, which is within ±15° and [B] represents the number of silver nanowires whose the longitudinal direction and the arrangement direction show a difference therebetween, which is ±15° or more)

A mechanochromic molecule may be composed of a spiropyran molecule, and the strength recognition layer may be composed of a spiropyran-PDMS complex molecule.

The strength recognition layer may have an increased magnitude of the normalized luminance as the contact strength increases.

Still yet another exemplary embodiment of the present invention provides a method for manufacturing a touch screen panel, including: a first step of moving a rod wound with a metal coil along an outer circumferential surface on a substrate so as to form a film in which silver nanowires are cross-aligned and laminating a plurality of films in a vertical direction to provide a location recognition layer; and a second step of laminating a strength recognition layer for recognizing a contact strength through a change of a color, which includes a composite molecule in which mechanochromic molecules and polydimethylsiloxane (PDMS) molecules are coupled to an upper surface of the location recognition layer.

The first step may include an injection process of locating the rod at a position spaced apart from the upper surface of the substrate and injecting a dispersion containing the silver nanowires between the rod and the substrate, and an alignment process of providing a film in which the silver nanowires are aligned in a direction which is the same as a movement direction of the rod through the guide grooves formed among the metal coils with horizontal movement of the rod to have a predetermined arrangement direction.

In the first step, the injection process and the alignment process may be repeatedly performed in one set, and a film may be provided, in which a plurality of films having different arrangement directions by differentiating the horizontal movement direction of the rod for each set is laminated in the vertical direction.

The method may further include, before the injection process, a preparation process of separating a pair of tape-shaped separators on the substrate so as to be parallel to each other to set a separation distance between the substrate and the rod.

In the preparation process, a horizontal or vertical length of the film may be determined by adjusting the distance that the pair of separators are spaced apart from each other.

The second step may include an application process of locating a bar at a location spaced apart from the upper surface of the location recognition layer and applying a solution containing a composite molecule in which spiropyran molecules and PDMS molecules are coupled between the bar and the location recognition layer, and a lamination process of laminating the strength recognition layer on the upper surface of the location recognition layer with horizontal movement of the bar.

Advantageous Effects

According to the silver nanowire film of the present invention as described above, since the degree of alignment of the silver nanowires is high, an efficient conductive network can be constructed.

Further, provided is a method for manufacturing the silver nanowire film which is based on a solution process and uses a rod on which metal is wound in a coil shape to easily control a meniscus of a silver nanowire dispersion and to consequently obtain a film having a high degree of alignment of silver nanowires. Forming various lamination structures of the films having the high alignment degree enables a transparent electrode having excellent electric conductivity and light transmittance to be manufactured.

Meanwhile, according to the touch screen panel of the present invention as described above, it is possible to uniformly and precisely recognize an electrical signal generated by the contact of two transparent conductive films by the metal nanowires cross-aligned at a high density and it is possible to recognize the contact strength by visualizing the contact strength through the color change.

In addition, since the touch screen panel is a transparent electrode which is uniformly aligned in a large area (20×20 cm$^2$), it is possible to recognize the contact position which is uniform over the entire area.

MODE FOR INVENTION

Figure 1:
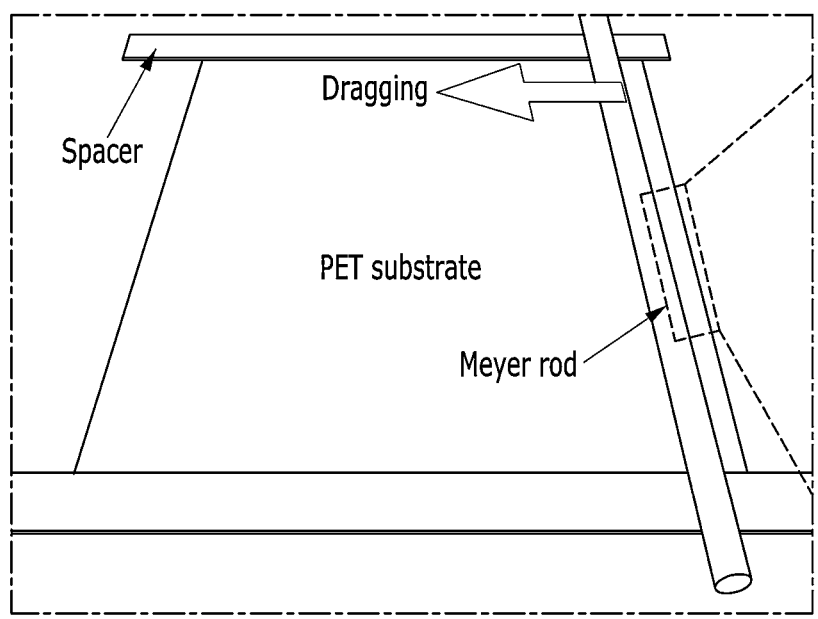
FIGS. 1 to 6 illustrate an experimental condition (FIG. 1) of coating rods moving at a constant rate with a silver nanowire dispersion sprayed on a substrate, a principle of controlling a meniscus contact line according to the experimental condition (FIG. 2), and bases showing that silver nanowire films having a high degree of alignment are formed through an actual experiment (FIGS. 3, 4, 5, and 6) in an exemplary embodiment of the present invention. (however, in each of FIGS. 3 and 4, a scale bar is 40 μm)
Figure 2:
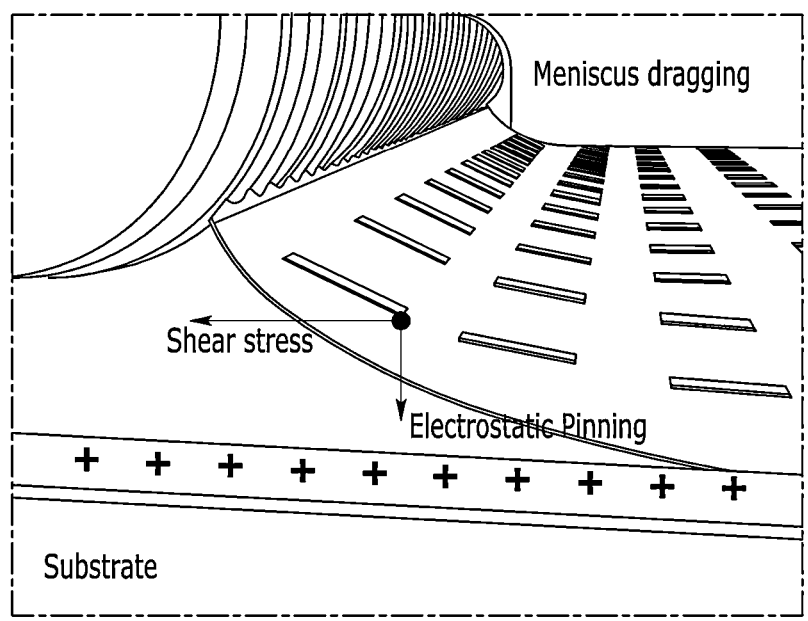

The present invention will be described more fully hereinafter with reference to the accompanying drawings, in which various exemplary embodiments of the invention are shown. The present invention may be implemented in various different forms and is not limited to exemplary embodiments described herein.

A part irrelevant to the description will be omitted to clearly describe the present invention, and the same elements will be designated by the same reference numerals throughout the specification.

Since the size and the thickness of each component illustrated in the drawings are arbitrarily represented for convenience in explanation, the present invention is not particularly limited to the illustrated size and thickness. In the drawings, the thickness of layers, films, panels, regions, etc., are exaggerated for clarity. In addition, in the drawings, for understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, a certain part being located "above" or "on" a reference portion means the certain part being located above or below the reference portion and does not particularly mean the certain part "above" or "on" toward an opposite direction of gravity.

In addition, unless explicitly described to the contrary, the word "comprise" and variations such as "comprises" or "comprising", will be understood to imply the inclusion of stated elements but not the exclusion of any other elements.

Further, throughout the specification, when it is referred to as "planar view", this means that an object portion is viewed from above, and when it is referred to as "cross-sectional view", this means that a vertical cross-section of the object portion is viewed from the side.

As indicated above, despite the excellent electrical conductivity of a silver nanowire material itself, silver nanowires cannot but be randomly arranged based on solution processes such as spin coating, spray coating, and the like, there is a limit to obtaining an film which is excellent in both electrical and optical properties.

However, the present inventors have succeeded in producing a silver nanowire film having a high degree of alignment in one direction by utilizing a rod in which metal is wound in the form of a coil.

Further, the silver nanowire films are laminated to enable a transparent electrode having excellent electrical conductivity and light transmittance to be manufactured. Based thereon, exemplary embodiments of the present invention will be described in detail.

Silver Nanowire Film

In an exemplary embodiment of the present invention, provided is a silver nanowire film including silver nanowires A unidirectionally aligned in a longitudinal direction; and silver nanowires B randomly aligned in the longitudinal direction, in which the silver nanowires A and the silver nanowires B each are plural and satisfy Equation 1 below:

$$[A]/([A]+[B]) > 2/3 \quad \text{[Equation 1]}$$

In Equation 1 above, [A] represents the number of silver nanowires A having an alignment degree within ±15° from the alignment direction, and [B] represents the number of silver nanowires B having an alignment degree of ±15° or more from the alignment direction.

Definition of Alignment Degree

Specifically, Equation 1 above relates to the alignment degree of the silver nanowires in the silver nanowire film. Specifically, the number [A] of unidirectionally aligned silver nanowires having the alignment degree within ±15° from the alignment direction with respect to the total number [A]+[B] of silver nanowires in the silver nanowire film is defined as a parameter relating to the alignment degree of the silver nanowires. The larger a parameter value of Equation 1 above, the higher the alignment degree of the silver nanowires.

Silver Nanowires

The silver nanowire A and the silver nanowire B may each have a size of a silver nanowire generally used. For example, each silver nanowire may have a length of 15 μm to 35 μm and a diameter of 20 nm to 40 nm. If the silver nanowires exceed the above ranges, there is a possibility that the silver nanowire will be more likely to be aggregated and light transmittance will be lowered. On the contrary, there is a problem in that the conductivity may be lowered when lengths of silver nanowires A and B are below the lower limit of each range.

Advantages of Alignment Degree Control

As indicated above, when the silver nanowire film is formed with the general solution process (e.g., spin coating), the silver nanowires in the film are mostly randomly arranged. Specifically, a silver nanowire film is formed, in which the parameter value of Equation 1 above is almost close to zero and a low alignment degree is kept at approximately 0.1 even if the parameter value reaches the maximum value.

In order to improve the electrical conductivity of the silver nanowire film having such an irregular arrangement, the quantity of the silver nanowires in the unit volume of the film is increased to increase the density, but when the density is increased, there still exists a problem that a large loss of the light transmittance occurs due to the random arrangement of the silver nanowires.

On the other hand, the silver nanowire film has a high alignment degree, and even if the silver nanowire film has the same density as the silver nanowire film of the irregular arrangement, a network by the silver nanowires A is already normally constructed, and as a result, the silver nanowire film may show sufficiently high electrical conductivity and the arrangement of the silver nanowire film is well aligned, and as a result, sheet resistance may be low and the high light transmittance may be shown.

Specifically, when a meniscus of a silver nanowire dispersion is controlled by using the rod wound with the metal in the form of the coil according to a manufacturing method described later, a silver nanowire film having a high alignment degree may be obtained, in which the parameter value of Equation 1 above reaches at least 2/3, specifically, a value of 0.7 to 0.8.

Light Transmittance and Sheet Resistance Properties

More specifically, the silver nanowire film may have high transmittance and low sheet resistance properties, based on the properties of the alignment degree described above.

When the silver nanowire film is a single layer, the light transmittance may be 88.0% or more, specifically 88.2% to 97.0%, more specifically 90.0% to 97.0%, or 95.0% to 97.0%.

When the silver nanowire film is the single layer, sheet resistance may be 45 $\Omega sq^{-1}$ or less (excluding 0 $\Omega sq^{-1}$), specifically 18.8 $\Omega sq^{-1}$ to 42.3 $\Omega sq^{-1}$, more specifically 20.0 $\Omega sq^{-1}$ to 42.3 $\Omega Sq^{-1}$, and 29.21 $\Omega Sq^{-1}$ to 33.74 $\Omega Sq^{-1}$.

Meanwhile, the random silver nanowire film manufactured by the general solution process (e.g., spin coating) has light transmittance of less than the above range and has sheet resistance exceeding the above range.

Polarization Property

The silver nanowire film may have an anisotropic optical property.

Specifically, when the silver nanowire film is irradiated with polarized light, the maximum absorbance may be exhibited in a wavelength range of 360 nm to 364 nm, and in this case, a full width at half maximum (FWHM) of the silver nanowire film may be 28.48 to 37.23. In addition, the silver nanowire film has a maximum absorption value which may increase as a polarization angle increases in the range of 0 to 90° and an absorbance value which may decrease in the wavelength range of more than 500 nm.

However, the random silver nanowire film manufactured by the general solution process (for example, spin coating) does not exhibit any absorbance property according to the polarization angle.

Achieving Large Area

The area of the silver nanowire film may range from 1 $cm^2$ to 1000 $cm^2$, for example, from 1 $cm^2$ to 400 $cm^2$, as described in an exemplary embodiment to be described later. Even if the silver nanowire film has a large area, the alignment degree of the silver nanowires is high enough to satisfy Equation 1 on the entire surface of the film and an interval of the inner silver nanowires A adjacent in the direction parallel to the longitudinal direction may be easily controlled and a high line density in the above-mentioned range may be achieved. This is a property due to the manufacturing method using a rod wound with the metal in a coil shape.

Of course, the area below the lower limit is also possible, but this may also be achieved in the general solution process. Meanwhile, it is expected that the area above the upper limit may be achieved by utilizing a rod in which larger metal is wound in the form of the coil.

Laminate

Meanwhile, as described above, the network by the silver nanowires A may be formed three-dimensionally by laminating two or more layers of silver nanowire films having the high alignment degree. Thus, a laminate having higher line density and higher light transmittance and lower sheet resistance than the single-layer film may be formed.

Specifically, the sheet resistance of the laminate may be 18.8 $\Omega Sq^{-1}$ to 42.3 $\Omega Sq^{-1}$, and the light transmittance of the laminate may be 88.2% to 97.0%.

In the adjacent layers in the laminate, the alignment directions of the silver nanowires A are parallel to each other, but the alignment directions may be different from each other. Particularly, when the adjacent layers are laminated in a direction perpendicular (90°) to each other, the electrical and optical properties may be better.

Method for Manufacturing Silver Nanowire Film

In another exemplary embodiment of the present invention, there is provided a method for manufacturing a silver nanowire film, including: locating a rod wound with metal in a coil shape to be spaced apart from one surface of a substrate; distributing a dispersion containing silver nanowires and a solvent between the substrate and the rod; moving the substrate and the rod relatively horizontally to coat the dispersion on one surface of the substrate; and drying the dispersion to obtain a silver nanowire film on one side of the substrate.

Specifically, in the step of moving the substrate and the rod relatively horizontally to coat the dispersion on one surface of the substrate, the longitudinal direction of the silver nanowires in the dispersion is aligned in the horizontal movement direction.

Process Principle

More specifically, in the step of distributing the dispersion containing the silver nanowires and the solvent between the substrate and the rod, a meniscus contact line may be formed where the surface of the dispersion and the metal wound on the rod contact each other. In this case, the meniscus contact line may also be horizontally moved in the relative horizontal movement direction of the substrate and the rod. In addition, with the horizontal movement of the meniscus contact line, the longitudinal direction of the silver nanowires in the dispersion may be aligned in a unidirectional direction.

FIGS. 1 to 6 are an experimental condition (FIG. 1) of coating rods moving at a constant rate with a silver nanowire dispersion sprayed on a substrate, a principle of controlling a meniscus contact line according to the experimental condition (FIG. 2), and bases showing that silver nanowire films having a high degree of alignment are formed through an actual experiment (FIGS. 3, 5, and 6) in an exemplary embodiment of the present invention.

In FIG. 1, a large-area (20×20 cm$^2$) PET substrate surface-treated with a poly-L-lysine solution is used. An amine functional group may be present on the surface of the substrate, and the amine surface functional group may act on the silver nanowire with electrostatic force. Thus, the substrate having the amine surface functional group may have improved adhesion to the silver nanowires. A detailed process of the surface treatment will be described later.

Further, in FIG. 1, the substrate is located in a bar coater equipped with a specific rod. The rod is a rod in which the metal is wound in the coil shape. A coil interval of the metal wound on the rod may be between 50 μm and 400 μm. The rod may be used while being mounted on a normal bar coater, but is not limited thereto.

A uniform interval between the rod and the substrate is established and the dispersion is sprayed into a void space between the rod and the substrate to form a uniform and thin silver nanowire dispersion layer.

Coil grooves in the rod apply capillary forces to a very small amount of silver nanowire dispersion. The capillary force causes a uniform meniscus of the dispersion to be formed between the rod and the substrate. Specifically, the silver nanowire dispersion trapped between the rod and the substrate has the meniscus contact line in contact with the coil of the rod.

In this state, when the rod and the substrate are relatively horizontally moved, the meniscus contact line is dragged by the coil of the rod. Then, with the movement of the meniscus contact line, shear force by which the silver nanowires may be aligned and hydrodynamic force due to such shear force are induced.

The force acting on the dispersion during the movement of the meniscus contact line is the interaction of the shear induced hydrodynamic force and the electrostatic force with the substrate. The interaction contributes to aligning the silver nanowires in the dispersion in the direction of the relative horizontal movement of the rod and the substrate.

Meanwhile, in the process of moving the meniscus contact line, an evaporation rate of the solvent in the dispersion is very low (approximately 10 μm s$^{-1}$ to 100 μm s$^{-1}$). Alternatively, as the evaporation rate of the solvent increases, convection in the dispersion occurs, which may result in a relatively low alignment degree of the silver nanowires.

However, when the meniscus contact line is quickly dragged (10 mm s$^{-1}$ or more) using the relative horizontal movement of the rod and the substrate, the alignment degree of the silver nanowires may be relatively high.

However, in the quick dragging of the meniscus contact line, viscous force may act as a main variable. This follows the Landau-Levich regime. Specifically, shear rate $\dot{\gamma}$ for the hydrodynamic force is expressed by Equation 1 below.

$$\dot{\gamma} = \partial v_x / \partial v_y = U_{fluid}/\delta$$

In Equation 1, $U_{fluid}$ represents the dragging rate of the dispersion and b represents a distance between the rod and the substrate. For example, when the dragging rate of the dispersion is 10 mm s$^{-1}$ and the distance between the rod and the substrate is 40 μm, the shear rate becomes 250 s$^{-1}$.

Meanwhile, the hydrodynamic force F is expressed by Equation 2 below.

$$F = \frac{4\pi\mu Ua}{\ln(2a/b) - 0.72} \quad \text{[Equation 2]}$$

In Equation 2, $\mu$ represents the viscosity of metal nanowire ink dispersed in the solvent and U represents the dragging rate using the rod. a represents the length of the metal nanowire and b represents the radius of the metal nanowire.

For example, the length a of the silver nanowires may be approximately 20 μm and the radius b may be approximately 17.5 nm. The dragging rate may be 10 mm s$^{-1}$.

When the silver nanowire ink is dispersed in ethanol, the viscosity p may be approximately $9.12 \times 10^{-3}$ Pa s at room temperature, and when the silver nanowire ink is dispersed in isopropyl alcohol (IPA), the viscosity p may be approximately $9.37 \times 10^{-3}$ Pa s at the room temperature. When the silver nanowire ink is dispersed in water, the viscosity $\mu$ may be approximately $9.52 \times 10^{-3}$ Pa s at the room temperature.

The hydrodynamic force of 3.26 nN is calculated when ethanol is used as the solvent in the dispersion according to Equation 2, the hydrodynamic force of 3.35 nN is calculated when isopropyl alcohol (IPA) is used, and the hydrodynamic force of 3.4 nN is calculated when water is used. In other words, it can be seen that all of ethanol, isopropyl alcohol, and water have hydrodynamic force values of 3.26 to 3.4 nN which is appropriate for aligning the metal nanowires with the high alignment degree.

The distance between the rod and the substrate may be controlled by a separator. In this regard, the manufacturing method may further include locating the separator between the substrate and the rod before distributing the dispersion solution containing the silver nanowires and the solvent between the substrate and the rod.

Meanwhile, shear stress a may be obtained by multiplying the shear rate by the viscosity $\mu$ of the dispersion ($\sigma = \mu \dot{\gamma}$). For example, the dispersion containing ethanol as the solvent may obtain shear stress of 0.26 Pa. When isopropyl alcohol (IPA) is used as the solvent, the value of the shear stress is 0.51 Pa, and when water is used as the solvent, the value of shear stress is 0.22 Pa. Accordingly, it can be regarded that all of ethanol, water, and isopropyl alcohol have a shear stress value suitable for aligning the silver nanowires with the high alignment degree.

A range of viscosity to form such appropriate shear stress may be between 1 cP and 10 cP. If the viscosity can be formed in the above range, the kind of solvent is not limited, and the ethanol, the water, and the IPA are merely examples.

Process Variables (Physical Factors)

In the manufacturing method according to the exemplary embodiment of the present invention, physical factors such as the amount of the silver nanowire dispersion, the relative horizontal movement speed of the substrate and the rod, and the temperature of the substrate during the horizontal movement may affect the alignment degree of the silver nanowires.

Specifically, as the amount of dispersion decreases, the relative horizontal movement speed of the substrate and the rod decreases, and the substrate temperature decreases during the horizontal movement decreases, the alignment degree of the silver nanowires increases.

Figure 7:
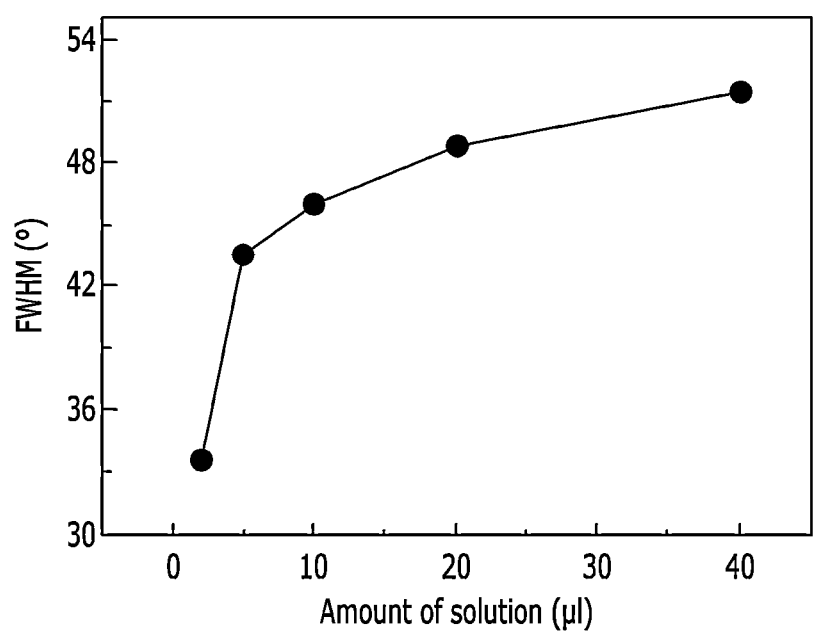
FIGS. 7 to 12 are diagrams illustrating a change in the degree of alignment according to physical process parameters (specifically, the amount of a dispersion) in an exemplary embodiment of the present invention. (however, in FIG. 12, the scale bar is 100 μm)

In particular, in FIG. 7 it can be seen that as the amount of dispersion increases, the full width at half maximum (FWHM) increases. This means that the alignment degree of the silver nanowires decreases. The FWHM increases because the density of the silver nanowires increases and a phenomenon in which the silver nanowires in the dispersion are entangled with each other is induced as the amount of the dispersion increases.

In addition, as the amount of the dispersion increases, a contact area between the meniscus and the substrate increases and in this case, the irregularly aligned silver nanowires may increase below the meniscus.

Therefore, in forming the silver nanowire film of one layer, it is necessary to control the amount of the dispersion per unit area (1 cm$^2$) of the substrate to 0.48 to 1.28 μL/cm$^2$.

As mentioned above, the coil interval of the metal wound on the rod may be in the range of 50 μm to 400 μm, and the amount of the dispersion per unit area (1 cm$^2$) of the substrate may be controlled according to the interval between the metal coils. The larger the interval of the metal coils, the greater the amount of dispersion per unit area (1 cm$^2$) of the substrate.

In addition, depending on the height of the separator for providing and holding a space between the rod and the substrate, the thickness of the meniscus may be influenced.

Specifically, when the height of the separator increases, the thickness of the meniscus increases, the shear rate decreases, and the alignment degree of the silver nanowires also decreases ($\dot{\gamma} = U_{fluid}/\delta$). When the height of the separator increases, a gradient of the shear force occurs, and the concentration of the irregularly aligned silver nanowires below the meniscus increases.

Therefore, in the step of locating the rod wound with the metal in the coil shape to be spaced apart from one surface of the substrate so as to form an appropriate meniscus thickness, the interval between the substrate and the rod needs to be in the range of 20 μm to 40 μm. Further, it is necessary to use the separator having a thickness in the same range as the interval range so as to maintain the interval.

Meanwhile, as the relative horizontal movement speed of the substrate and the rod decreases, the thickness of the meniscus film may increase. As the thickness of the meniscus film becomes thinner, the shear stress may be strengthened, and as a result, the alignment degree of the silver nanowires may be improved.

On the contrary, as the relative horizontal movement speed of the substrate and the rod increases, the thickness of the meniscus film may increase, and as a result, the shear stress may be weakened, thereby reducing the alignment degree of the silver nanowires.

Therefore, the horizontal movement speed needs to be within the range of 10 mm s$^{-1}$ to 30 mm s$^{-1}$ so as to form an appropriate meniscus thickness Last, as the substrate temperature during the relative horizontal movement increases, the viscosity of the silver nanowire ink may be lowered, and as a result, the shear stress is weakened, thereby hindering effective alignment of the silver nanowires.

Therefore, in order to suppress a meniscus temperature gradient, the temperature of the substrate during the horizontal movement needs to be within the range of 20° C. to 30° C.

Process Variables (Chemical Factors)

As mentioned above, chemical properties of the substrate surface may affect the alignment degree of the silver nanowires.

In this regard, the substrate may be one in which the functional group, such as amine, methyl, hydroxyl, or a combination thereof, is present on the side where the silver nanowire film is located.

The methyl functional group may be formed by treating hexamethyldisilazane (HMDS), poly (methyl methacrylate) (PMMA), and mixtures thereof.

The hydroxyl functional group may be formed according to an O$_2$ plasma treatment.

The amine functional group may be formed by treating poly-L-lysine (PLL), (3-aminopropyl) triethoxysilane (APTES), and mixtures thereof.

Specifically, when the amine functional group is present, strong attraction force between a positively charged substrate and a negatively charged silver nanowire acts to improve the alignment degree of the silver nanowires.

Laminate Forming Process

Meanwhile, the manufacturing method may further include drying the dispersion to obtain the silver nanowire film on one side of the substrate; then, locating the rod wound with the metal in the coil shape to be spaced apart from one surface of the silver nanowire film; distributing the dispersion containing the silver nanowires and the solvent between the silver nanowire film and the rod; moving the silver nanowire film and the rod relatively horizontally to coat the dispersion on one surface of the silver nanowire film; and drying the dispersion to obtain a laminate of the silver nanowire film.

This exemplifies a method of laminating the silver nanowire film into two layers. Therefore, it is also possible to repeatedly perform the series of steps to form a silver nanowire film so as to have three layers, four layers, or even more layers.

In the process of laminating two or more silver nanowire films, the relative horizontal direction between the substrate and the film may be different for each layer.

For example, an angle between the relative horizontal movement direction in relatively horizontally moving the substrate and the rod to coat the dispersion on one surface of the substrate and a relative horizontal direction in relatively horizontally moving the silver nanowire film and the rod to coat the dispersion on one surface of the silver nanowire film may be arbitrarily selected within the range of 0° to 90°. Specifically, both directions may be perpendicular (90°) to each other.

Substrate

The substrate may be made of glass, silicon, polyethylene terephthalate (PET), or a combination thereof, but is not limited thereto. When a substrate having high transparency is used to form the silver nanowire film by the above-described method, the transparent electrode may be obtained. In addition, a flexible transparent electrode may be obtained by using a flexible substrate.

Hereinafter, preferred examples of the present invention and evaluation examples thereof will be described. However, the following Examples are merely the exemplary embodiments of the present invention, and the present invention is not limited to the following Examples.

Example 1: Forming Film in which Silver Nanowires are Aligned in Unidirectional Direction (1) Preprocessing (Washing) Process of Substrate As the substrate, a substrate made of a plastic material and having a width of 20 cm, a length of 20 cm, and a height of 100 μm was prepared. Washing was performed as a prior step of surface treatment of the substrate.

Specifically, the substrate was sequentially dipped in deionized water, acetone, and isopropyl alcohol (IPA) and sonicated for 10 minutes in a dipped state, and the surface was cleanly washed.

(2) Surface Treatment Process of Substrate

After the washing process, a functional group was formed on the surface of the substrate by any one of the following three surface treatment methods. (The following three surface treatment methods are independent of each other.)

1) $O_2$ plasma treatment

The washed substrate was subjected to $O_2$ plasma treatment with radio frequency (RF) power of 18 W for 10 minutes.

As a result, a substrate having a —OH (hydroxyl) surface functional group might be obtained.

2) Poly-L-Lysine Treatment

Poly-L-lysine and water were mixed to prepare a poly-L-lysine solution. In this case, the content of poly-L-lysine in the total amount of poly-L-lysine solution (100 wt %) was adjusted to 0.1 wt %.

2 ml of the poly-L-lysine solution was taken and applied to the washed substrate and bar-coated at a rate of 10 mm s$^{-1}$.

As a result, a substrate having a —NH$_2$ (amine) surface functional group might be obtained.

3) Hexamethyldisilazane (HMDS) Treatment

As hexamethyldisilazane (HMDS), a material having a purity of 99.9% or more was used.

As a result, a substrate having a —CH$_3$ (methyl) surface functional group might be obtained.

(3) Forming Process of Silver Nanowire Film (One Layer)

The silver nanowire film was formed on each of the substrates having the surface functional groups.

Specifically, a rod (manufactured by RD Specialties, trade name: Meyer rod) wound with the metal in the coil shape was mounted on a bar coater (manufactured by CORETECH) capable of controlling the speed and the temperature. In this case, the metal wound on the rod was stainless steel, and the coil interval adopted any one of 51 μm (standard name: #2 bar), 76 μm (standard name: #3 bar), 152 μm (Standard name: #6 bar), and 381 μm (standard name: #15 bar).

The substrate was located in the bar coater equipped with the rod. In this case, an interval of 40 μm was provided between one surface of the substrate and the rod. Further, a long axis of the rod was positioned at one corner of the substrate.

Then, the separators were attached to two corners of the substrate perpendicular to the long axis of the rod. Specifically, as the separator, a bonding tape having a thickness of 40 μm (manufactured by 3M) was used. The separator served to maintain a constant interval between one surface of the substrate and the rod in the process of driving the bar coater to be described later.

Meanwhile, the dispersion was prepared by mixing a silver nanowire having a length of 20 μm and a diameter of 35 nm with any one solvent of water, ethanol, and isopropyl alcohol. In this case, the content of the silver nanowires to the total amount of the dispersion (100 wt %) and the resulting dispersion viscosity were varied according to the following evaluation examples.

The dispersion was sprayed to a space between one surface of the substrate and the rod using a micropipette. In this case, the meniscus contact line in which the surface of the dispersion and the metal wound on the rod are in contact with each other is formed, which can be seen in an evaluation example to be described later.

Then, in a state where the substrate is fixed, the bar coater is driven so that the rod moves at a constant speed, and the meniscus contact line is moved in a direction in which the rod moves. In this case, the movement speed of the rod and the temperature of the substrate were varied according to the evaluation example to be described later.

The bar coater stopped being driven while the dispersion was fully coated on one surface of the substrate, and the solvent in the coated dispersion was evaporated within several tens of seconds. Accordingly, on one surface of the substrate, a film in which most silver nanowires are aligned in the unidirectional direction is formed, which can be seen in the evaluation example to be described later.

(4) Forming Process of Silver Nanowire Film (Two Layers)

According to the evaluation example to be described later, the above-described process was repeated to form a two-layer silver nanowire film.

In this case, after the substrate on which a silver nanowire film of one layer is formed according to the above-described process was obtained, the substrate is rotated in the direction of 0° to 90° (0° indicates that the substrate does not rotate) and another layer of silver nanowire film was laminated again according to the above-mentioned process.

Comparative Example 1: Forming Film in which Silver Nanowires are Randomly Aligned The same substrate as the Example was subjected to the same washing process and then the silver nanowire films were formed by a commonly used bar-coating method.

Accordingly, on one surface of the substrate, a film in which most silver nanowires are randomly aligned was formed, which can be seen in the evaluation example to be described later.

Evaluation Method

In the following evaluation examples, the following evaluation methods were used Sheet resistance measurement: A sheet resistance value was measured through a four-point probe using a Kiethley 2400 instrument.

Transmittance and absorption spectrum: was measured through UV-vis-NIR spectrophotometer equipment.

Polarization property: was measured by mounting the polarization lens on the UV-vis-NIR spectrophotometer equipment.

Structure of silver nanowire: was observed through a microscope (PSM-1000, Olympus).

Evaluation Example 1: Related to FIGS. 3 to 6

(1) Variable control of Example 1 and Comparative Example 1

In order to evaluate the alignment degree and the light absorption properties, variables were controlled as follows in Example 1 and Comparative Example 1, respectively.

1) Specification of substrate: 2 an area of 2.5×2.5 cm$^2$ or 20×20 cm$^2$ and a thickness of 100 μm 2) Material of substrate: polyethylene terephthalate (PET) or glass 3) Metal material of rod and coil gap: stainless steel and 51 μm (bar #2)

4) Thickness of separator: 40 μm

5) Solvent used in the dispersion: ethanol

6) Load moving speed (coating speed): 10 mm s$^{-1}$

7) Temperature of substrate at coating: room temperature (23° C.)

Figure 3:
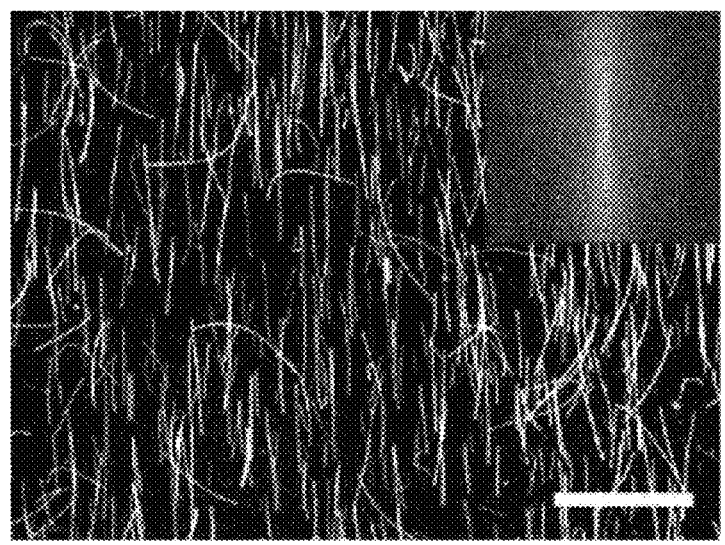
Figure 4:
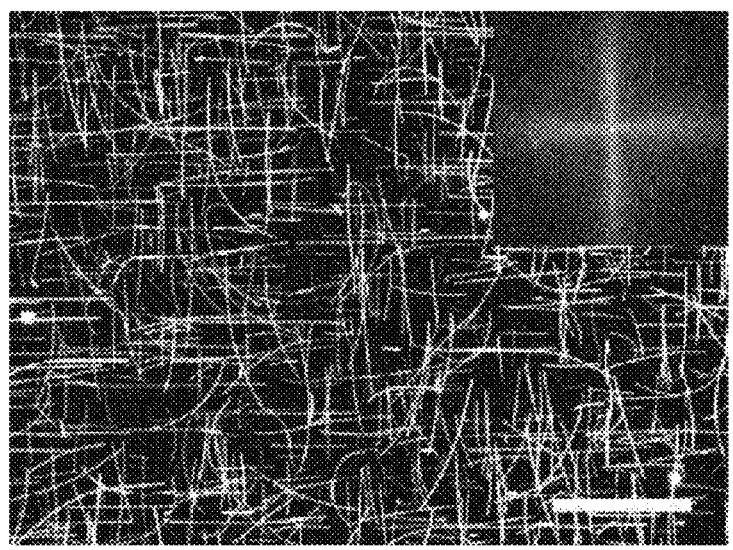

(2) FIGS. 3 and 4

FIGS. 3 and 4 are photomicrographs of a silver nanowire film formed by a single layer (FIG. 3) and two layers (FIG. 4), respectively, on a glass substrate having an area of 2.5×2.5 cm$^2$ in Example 1.

More specifically, referring to FIG. 3, it can be seen that in a silver nanowire film having an area of approximately 200×150 μm$^2$, the total number of silver nanowires is approximately 150 and the number of silver nanowires having an alignment degree within ±15° from the alignment direction is approximately 115, and the remaining silver nanowires are silver nanowires having an alignment degree of ±15° or more from the alignment direction.

In this regard, in the above description, the silver nanowires having an alignment degree within ±15° from the alignment direction are defined as "silver nanowires A undirectionally aligned in the longitudinal direction" and simply referred to as "silver nanowires A" and the number of silver nanowires A is expressed as "[A]". Further, the silver nanowires having the alignment degree of ±15° or more from the alignment direction are defined as "silver nanowires B arranged randomly in the longitudinal direction" and simply referred to as "silver nanowires B" and the number of silver nanowires B is expressed as "[B]".

Meanwhile, in the above description, the alignment degree of the silver nanowires in the silver nanowire film is evaluated by [A]/([A]+[B]) ([Equation 1]) and in FIG. 3, it is seen that the value of the alignment degree is 0.77.

In the case of Comparative Example 1, it can be seen that it is difficult to confirm the value of [A] identified according to the above definition on the property of the silver nanowire film having a random structure, so that the degree of alignment is close to zero.

Further, in FIG. 4, silver nanowire structures in the two-layer silver nanowire film may be confirmed. Specifically, the two-layer silver nanowire film is formed such that the directions of the silver nanowires A alignment in the respective layers are perpendicular to each other. In FIG. 4, each layer has the alignment degree equal to that of FIG. 3. By laminating the layers in the directions perpendicular to each other, the density of the silver nanowires in the entire laminate may be improved.

As a result, the bar coating method proposed in the exemplary embodiment of the present invention is a method that may precisely control the structure of the silver nanowire, thereby establishing an efficient conductive network of the resulting obtained silver nanowire film (especially the laminate).

(3) FIG. 5

Generally, the full width at half maximum (FWHM) value of the silver nanowires that are randomly aligned according to the solution process may not be obtained and the full width at half maximum (FWHM) value of silver nanowires which are completely unaligned is equal to or higher than 40.

Figure 5:
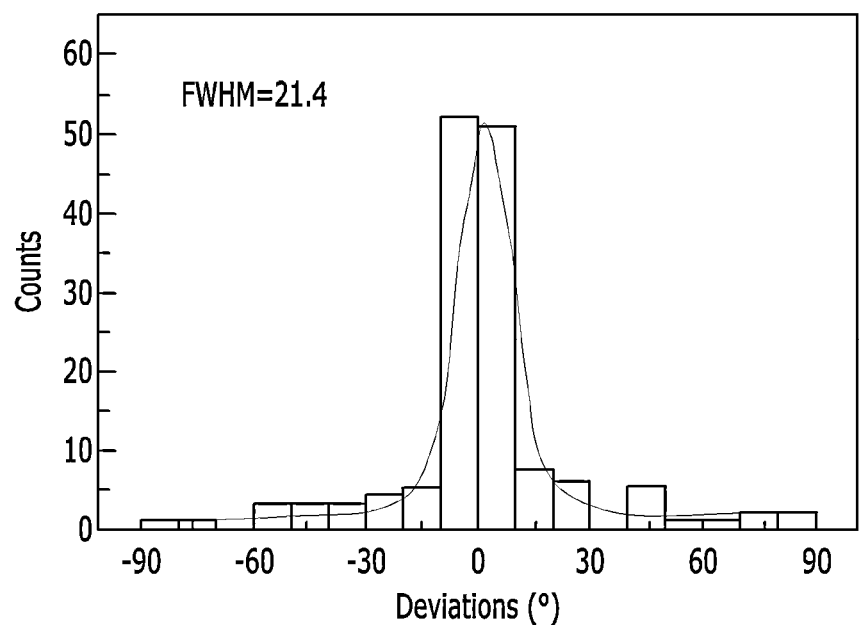

Meanwhile, FIG. 5 relates to a silver nanowire film formed as a single layer on a glass substrate having an area of 2.5×2.5 cm$^2$ in Example 1. In FIG. 5, the full width at half maximum (FWHM) of Example 1 is shown as 21.4. The FWHM having a small value supports that silver nanowires in the silver nanowire film are well aligned in one direction.

(4) FIG. 6

Figure 6:
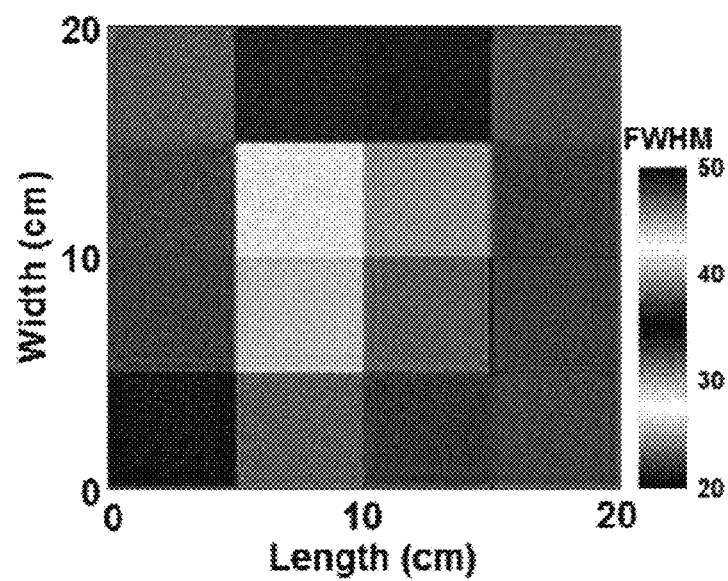

FIG. 6 illustrates the distribution of the FWHM values of the silver nanowire film formed as a single layer on a polyethylene terephthalate (PET) substrate having an area of 20×20 cm$^2$ and a thickness of 100 μm.

From this, it can be quantitatively seen that the bar coating method proposed in the exemplary embodiment of the present invention has an advantage in that the silver nanowires are normally aligned in one direction over the large-area substrate.

Evaluation Example 2: Related to FIGS. 7 to 12

(1) Variable control of Example 1 and Comparative Example 1

In order to evaluate the physical process variables, the variables were controlled as follows in Example 1 and Comparative Example 1, respectively.
  1) Material of substrate: glass
  2) Specification of substrate: an area of 2.5×2.5 cm$^2$ and a thickness of 1 mm
  3) Metal material of rod and coil gap: stainless steel and 51 μm (bar #2)
  4) Thickness of separator: 40 μm
  5) Solvent used in the dispersion: ethanol
  6) Load moving speed (coating speed): 10, 20, 30, 50, or 70 mm s$^{-1}$
  7) Temperature of substrate at coating: 23, 30, 40, 50, or 60° C.

(2) FIG. 7

In FIG. 7, it can be seen that as the amount of the solution increases within a range of more than 0 and 40 μl or less, the full width at half maximum (FWHM) increases and thus the alignment degree decreases.

As a result, it can be seen that, in the bar coating method proposed in the exemplary embodiment of the present invention, the smaller the amount of the solution to be used, the better the improvement in the alignment degree of a finally obtained film.

However, in consideration of the density of the finally obtained film, an amount of at least 2 μl or more will need to be ensured.

(3) FIG. 8

Figure 8:
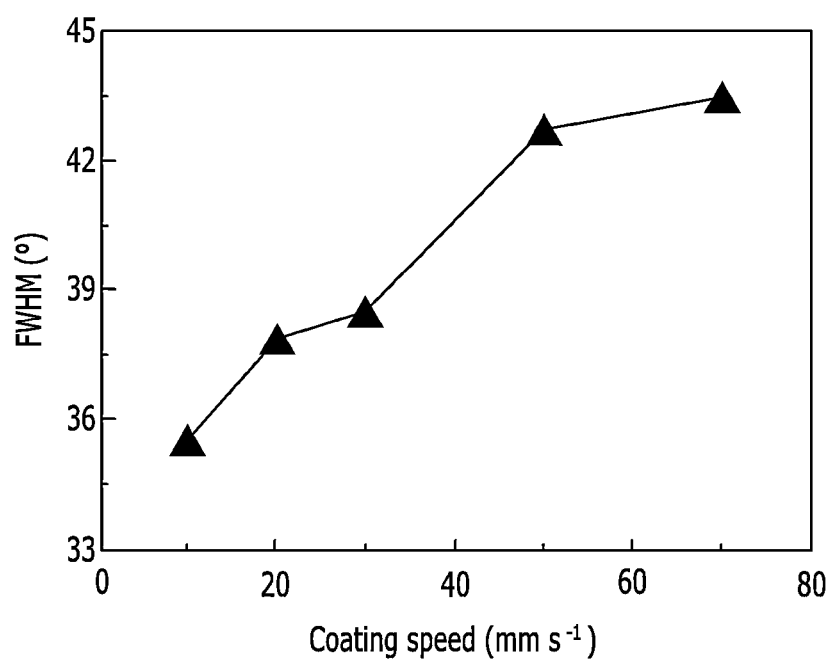

In FIG. 8, it can be seen that as the moving speed (coating speed) of the rod increases within the range of 10 mm/s to 80 mm/s, the FWHM increases, and as a result, the alignment degree is reduced.

As a result, it can be seen that, in the bar coating method proposed in the exemplary embodiment of the present invention, the lower the moving speed (coating speed) of the rod, the better the alignment degree in the finally obtained film is improved.

However, for the formation of minimum shear stress, a speed of 10 mm/s or more will need to be secured.

(4) FIG. 9

Figure 9:
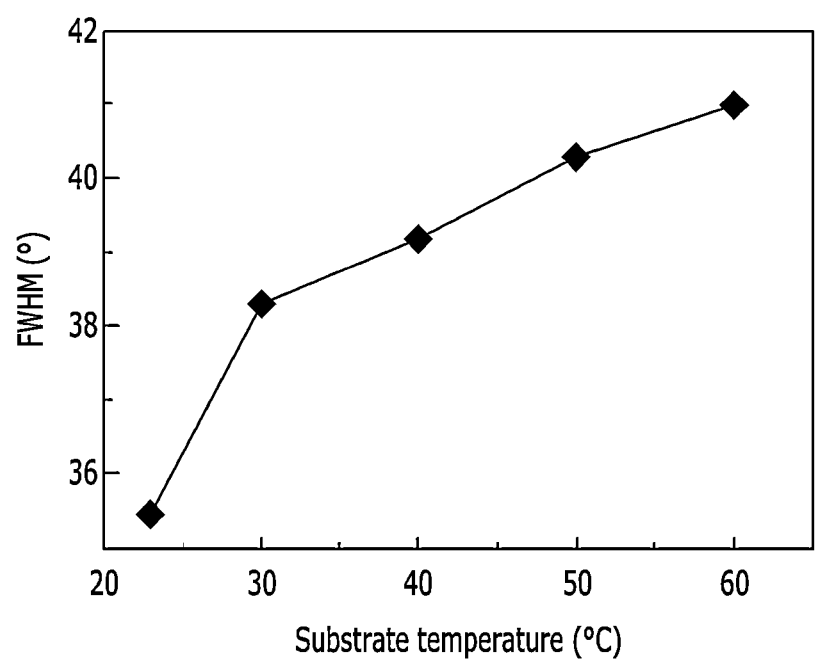

In FIG. 9, it can be seen that as the temperature of the substrate increases within the range of 23° C. to 60° C., the FWHM increases and thus the alignment degree decreases.

As a result, it can be seen that in the bar coating method proposed in the exemplary embodiment of the present invention, it is advantageous that the lower the temperature of the substrate, the better the improvement in the alignment degree of the finally obtained film.

However, when the temperature is controlled to be lower than room temperature, process cost increases, and the alignment degree may still be lowered due to the lowering of the evaporation rate of the solution, and as a result, the substrate temperature needs to be controlled to a temperature equal to or higher than the room temperature.

Figure 10:
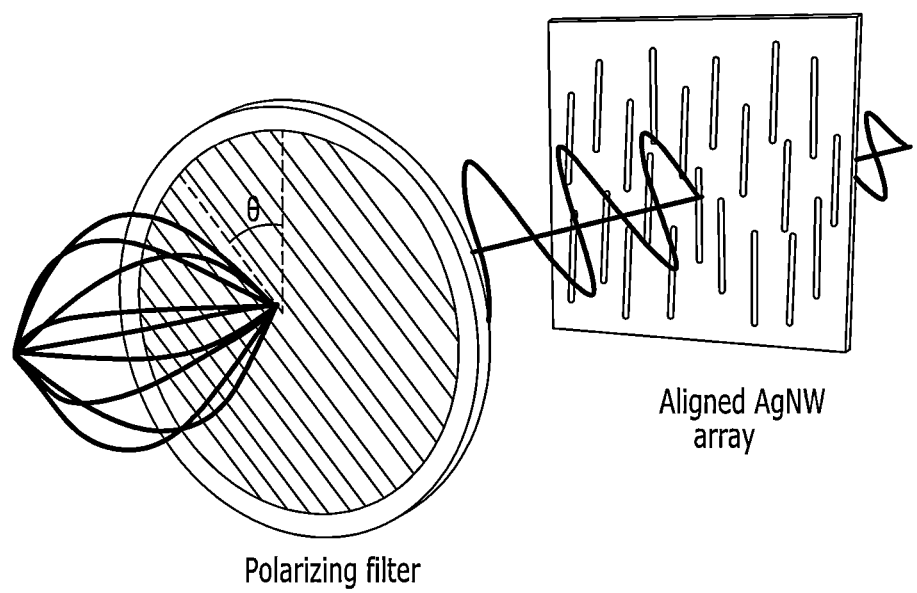
Figure 11:
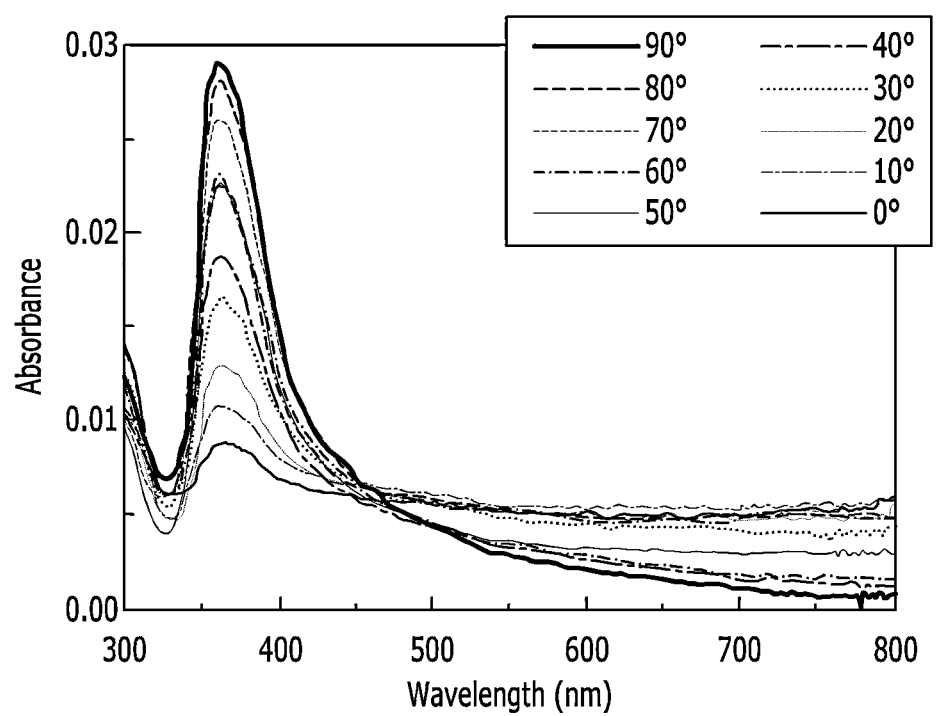

(5) FIGS. 10 and 11

FIGS. 10 and 11 are diagrams illustrating a structure for measuring the polarization property according to an alignment angle of the silver nanowires.

Specifically, FIG. 11 is a polarization absorption spectrum according to an angle (0 to 90°) between a polarizing plate and the alignment direction (the longitudinal direction of the silver nanowire A) of the silver nanowires.

Referring to FIG. 11, it can be confirmed that the absorbance in a region of 360 to 364 nm is 0.029, and a maximum absorbance value increases as the polarization angle increases in the range of 0 to 90°, and rather, the absorbance value decreases in a wavelength region of more than 500 nm.

This supports that aligned silver nanowire film may exhibit the polarization property.

(6) FIG. 12

Figure 12:

FIG. 12 is a photograph of a polarizing microscope after patterning the silver nanowire film formed in a letter shape of "UNIST" according to Example 1 using a photolithography method.

According to FIG. 12, the patterned silver nanowires are not visible when the angle θ between the polarizing plate and the alignment direction (the longitudinal direction of the silver nanowires A) of the silver nanowires is 0°, and the patterned silver nanowires are clearly visible when the angle θ is 90°.

Thus, it can be confirmed that the silver nanowire film having the polarization property is obtained according to the bar coating method proposed in the exemplary embodiment of the present invention.

Evaluation Example 3: Related to FIGS. 13 to 20

(1) Variable Control of Example 1 and Comparative Example 1

In order to evaluate the resistance property, the variables were controlled as follows in Example 1 and Comparative Example 1, respectively.
  1) Material of substrate: glass or polyethylene terephthalate (PET)
  2) Specification of substrate: an area of 2.5×2.5 cm$^2$ and a thickness of 1 mm (glass); an area of 20×20 cm$^2$ and a thickness of 100 m (PET)
  3) Metal material of rod and coil gap: stainless steel and 51 μm (#2 bar)
  4) Thickness of separator: 40 μm
  5) Solvent used in the dispersion: ethanol(ethanol)
  6) Load moving speed (coating speed): 10 mm s$^{-1}$
  7) Temperature of substrate at coating: 23° C.

Figure 13:
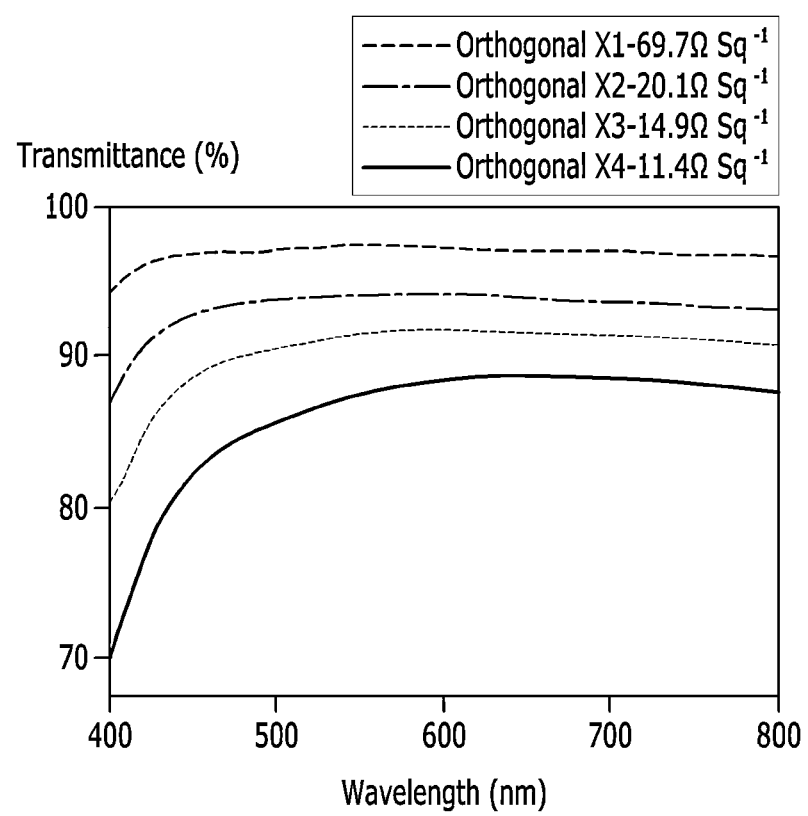
FIGS. 13 to 20 illustrate evaluation conditions and results according to evaluation example 3 of the present invention.
Figure 14:
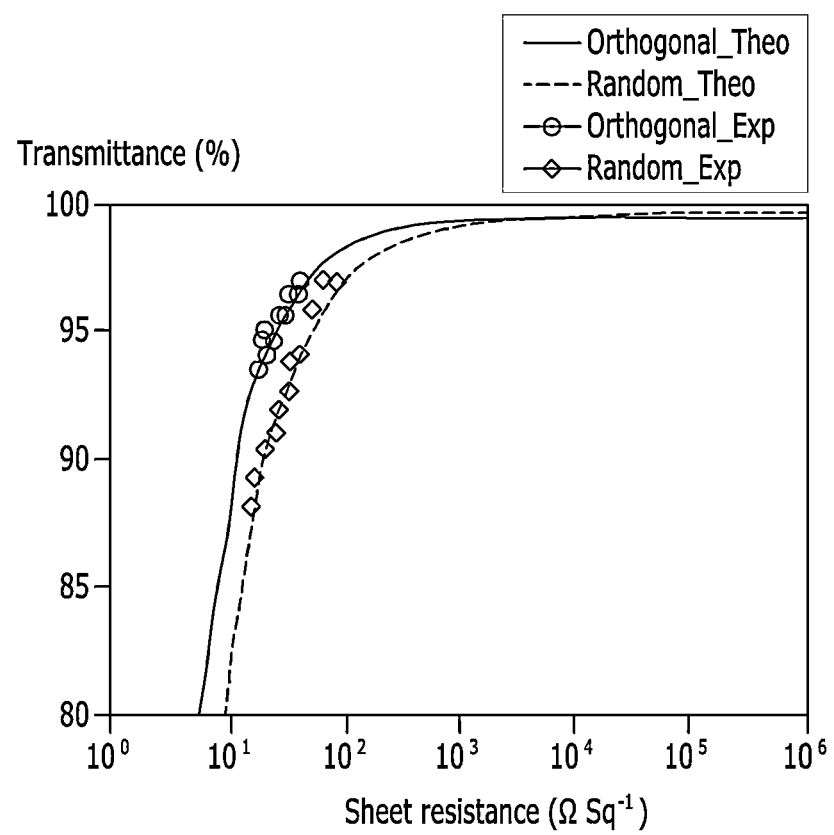
Figure 15:
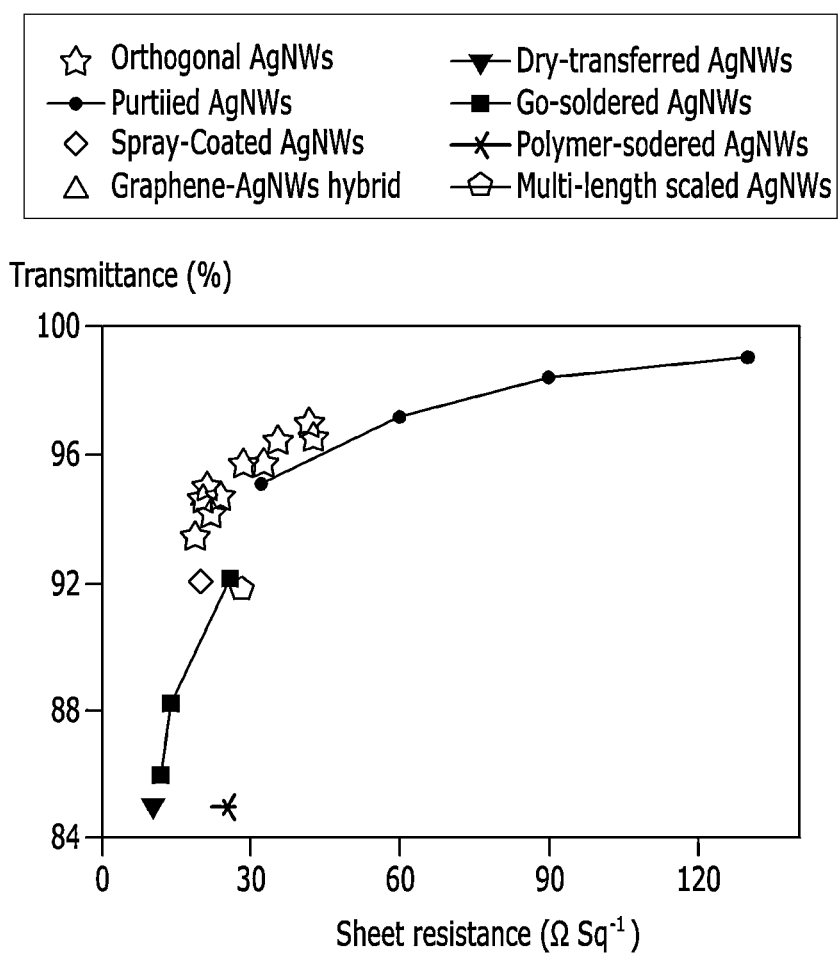

(2) FIGS. 13, 14, and 15

In FIG. 13, it can be seen that as the number of laminated layers of the silver nanowire film increases within the range of 1 to 4 layers, the light transmittance is lowered, and the light transmittance is inversely proportional to the sheet resistance.

However, even in the case of four layers having the greatest number of laminated layers, for example, suitable transmittance for use as the transparent electrode is ensured.

Further, in FIG. 14, a figure of merit value of 253.87 of a laminated nanowire film-based transparent electrode is higher than the figure of merit value of 478.96 of a random silver nanowire film-based transparent electrode. This shows that the laminated silver nanowire film has better light transmittance and sheet resistance performance than the random silver nanowire-based transparent electrode.

(3) FIGS. 16 to 20

Figure 16:
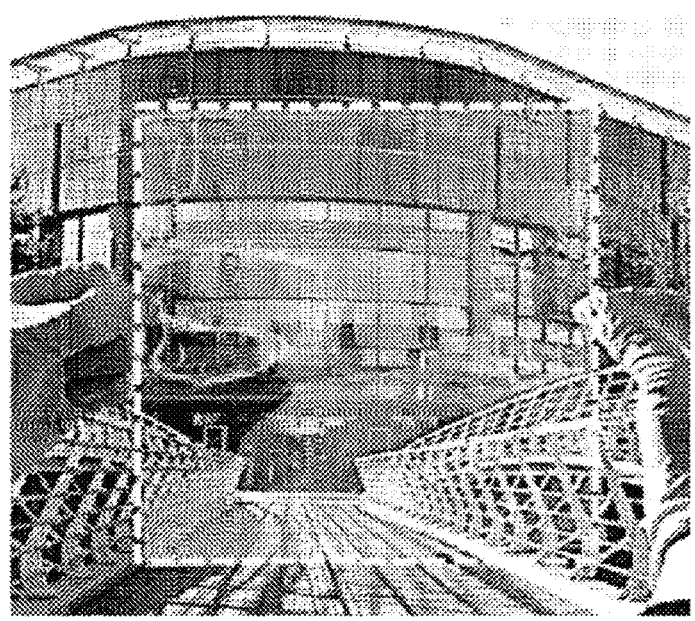
Figure 16:
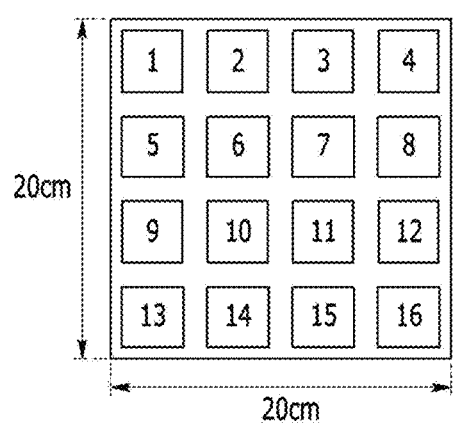

A lower diagram of FIG. 16 is an idea diagram for implementing the large area transparent electrode by connecting the silver nanowire film.

An upper diagram of FIG. 16 illustrates an image in which the two-layer silver nanowire film aligned in the orthogonal direction according to the method of Example 1 is divided into 16 parts with respect to a polyethylene terephthalate (PET) substrate having a large area (20×20 cm$^2$) and the idea diagram is actually implemented, and the actually implemented idea diagram is photographed.

Meanwhile, a silver nanowire film irregularly aligned according to the method of Comparative Example 1 was divided into 16 parts on the large-area (20×20 cm$^2$) PET (polyethylene terephthalate) substrate and evaluated in comparison with the large-area transparent electrode according to the method of Example 1.

Figure 17:
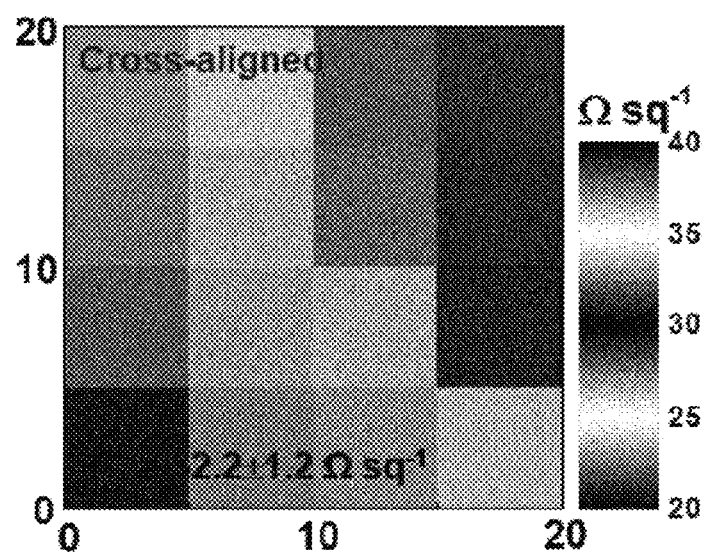

Specifically, according to FIG. 17, it can be seen that the large-area transparent electrode manufactured according to the method of Example 1 shows uniform sheet resistance in the range of 29.21 to 33.74 $\Omega Sq^{-1}$ over the entire surface.

Figure 18:
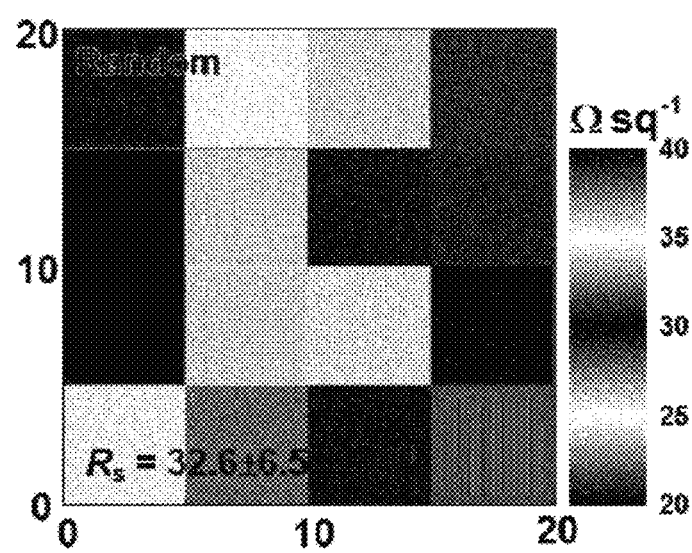

Meanwhile, according to FIG. 18, it can be seen that the large-area transparent electrode manufactured according to the method of Comparative Example 1 shows non-uniform sheet resistance over the entire surface.

Figure 19:
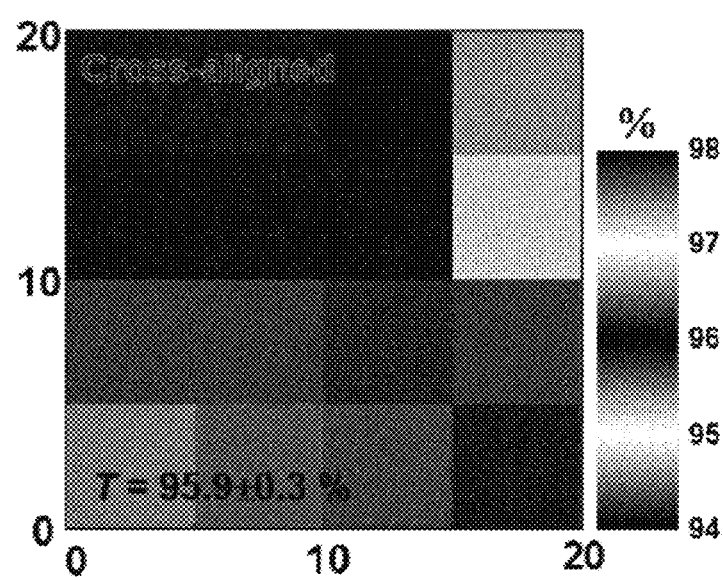

Further, according to FIG. 19, it can be seen that the large-area transparent electrode manufactured according to the method of Example 1 shows uniform light transmittance in the range of 95.24 to 96.31% over the entire surface.

Figure 20:
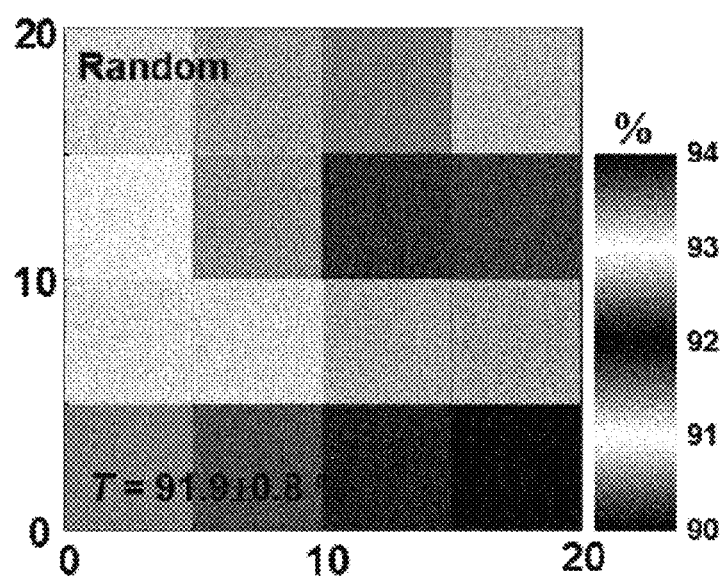

Meanwhile, according to FIG. 20, it can be seen that the large-area transparent electrode manufactured according to the method of Comparative Example 1 shows non-uniform light transmittance over the entire surface.

Touch Screen Panel

The touch screen panel according to the exemplary embodiment of the present invention will be described with reference to FIG. 21.

Figure 21:
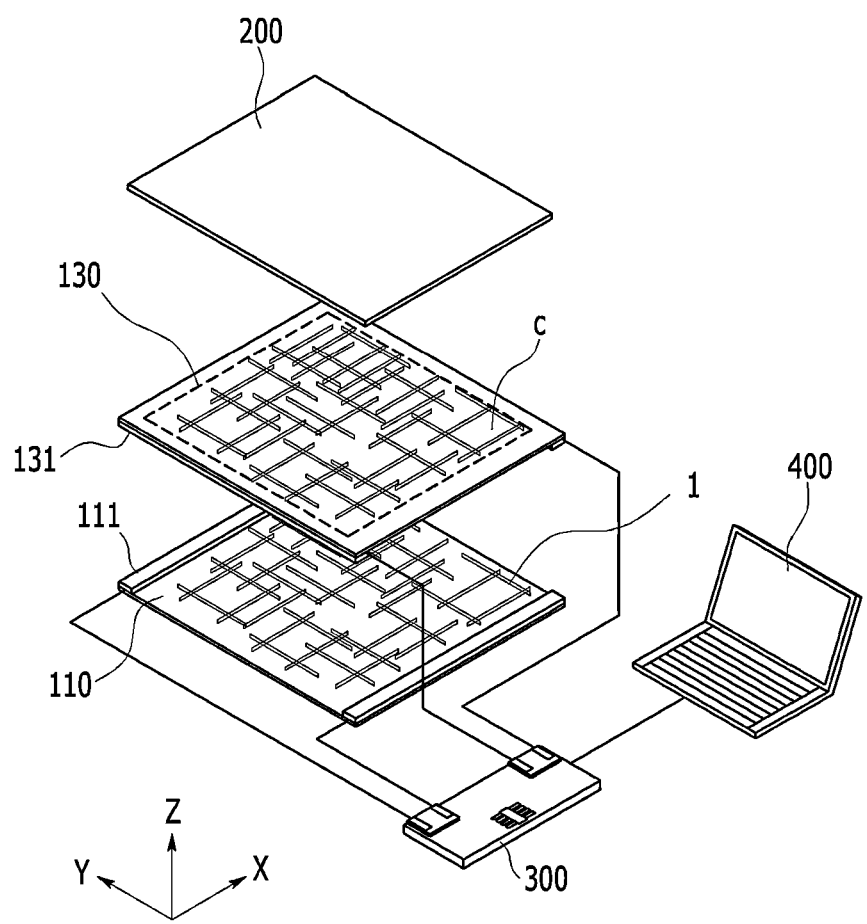
FIG. 21 is a diagram illustrating a shape of a touch screen panel according to an exemplary embodiment of the present invention.

Referring to FIG. 21, the touch screen panel according to the exemplary embodiment is constituted by a location recognition layer 100 and a strength recognition layer 200.

The location recognition layer 100 includes silver nanowires 1 which are cross-aligned and is capable of recognizing a contact location through a voltage change. The location recognition layer 100 may be configured by laminating a film for recognizing the contact location of a horizontal axis and a film for recognizing the contact location of a vertical axis with each other, and the contact location of two films may be recognized through the voltage change.

More specifically, the location recognition layer 100 may be formed in such a manner that a plurality of silver nanowires 1 is cross-aligned with each other to form a network and when the location recognition layer 100 is constituted by two films, a function to recognize the contact location may be performed through the voltage change depending on the contact between two films.

Specifically, a dispersion in which the silver nanowires 1 such as silver (Ag) nanowires, copper (Cu) nanowires, and the like and a polymer material such as polyvinylpyrrolidone (PVP), or the like are mixed with a solvent such as isopropyl alcohol (IPA), water, or the like may be used as a material for forming the location recognition layer 100.

The silver nanowire 1 has a property in which durability and electrical conductivity are excellent as compared with price. The silver nanowire 1 may be formed in a form having a length of several hundred micrometers and an average diameter of 20 to 40 nm. However, the present invention is not limited thereto.

By arranging the silver nanowires 1 having excellent electrical conductivity in a cross-aligned manner, the location recognition layer 100 may have properties of low sheet resistance, high light transmittance, and excellent electrical conductivity and may provide uniform electrical conductivity to the entire area of the location recognition layer 100.

As described later, when an electrode is connected to the end of the location recognition layer 100 and a writing tool is brought into contact with the touch screen panel, it is possible to recognize the location where the writing tool comes in contact with the voltage change.

Unlike the existing flexible touch screen panel in which the durability of the conductive film is lowered due to bending, since the location recognition layer 100 using the silver nanowires is excellent in durability, the location recognition layer 100 may be used as a conductive film of the flexible touch panel even in frequent bending.

The strength recognition layer 200 is laminated on the top of the location recognition layer 100 to contact the outside and includes a composite molecule in which mechanochromic molecules and polydimethylsiloxane (PDMS) molecules are coupled to each other, and as a result, it is possible to recognize the contact strength through the change of the color.

The strength recognition layer 200 may be laminated and integrally formed on the upper surface of the location recognition layer 100 to form the touch screen panel. The strength recognition layer 200 may correspond to a portion which directly contacts the writing tool, or the like. When a film made of a polymer material such as polyethylene terephthalate (PET) or the like is adhered to the upper surface of the location recognition layer 100 as in the conventional case, it is impossible to recognize the contact strength even if the writing tool is contacted.

Here, the term "mechanochromic molecule" refers to a molecule that exhibits a clear color change due to physical stimulation and has a property of returning to its original state again when the stimulus is removed. The strength recognition layer 200 may be configured to include a composite molecule in which the mechanochromic molecule and the PDMS molecule are coupled to each other and in this case, when force is applied to the strength recognition layer 200 through the writing tool, or the like, the color may be changed in the strength recognition layer 200 according to the strength of the force. Accordingly, it is possible to recognize the location as well as the strength of the contact applied to the touch screen panel.

Figure 22:
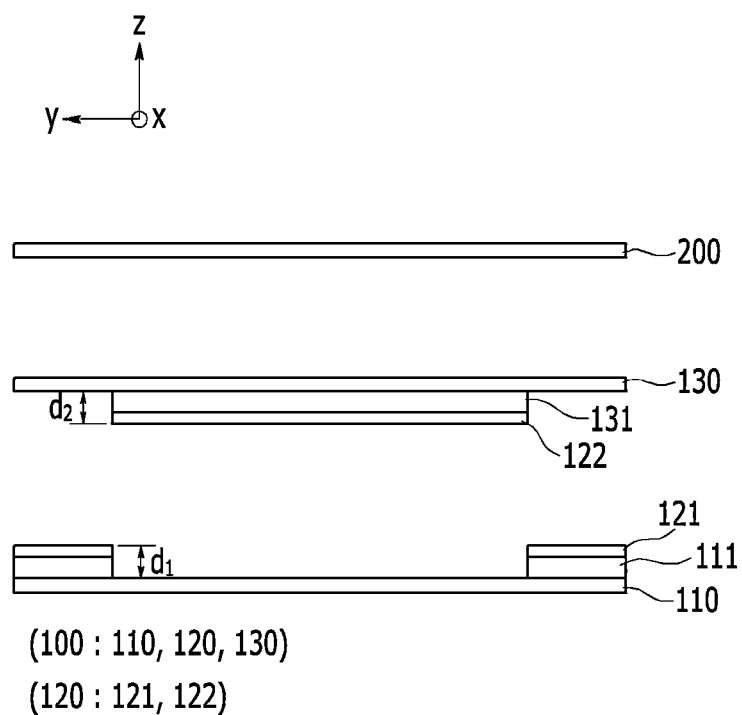
FIG. 22 is a diagram illustrating a side of the touch screen panel according to the exemplary embodiment of the present invention.

Referring to FIG. 22, the location recognition layer 100 may include: a first laminate 110 recognizing the contact location of the horizontal axis; a spacer 120 connected along a rim of the upper surface of the first laminate 110 to provide a central region C partitioned by the rim; and a second laminate 130 connected to the first laminate 110 through the spacer 120 and spaced apart from the central region C and recognizing the contact location of the vertical axis.

The first laminate 110 is made of a material including the cross-aligned silver nanowires 1 and the contact location of the horizontal axis of the first laminate 110 may be recognized with respect to an external contact, such as the writing tool. Here, the horizontal axis may be expressed as an X-axis direction in FIG. 22.

The spacer 120 is connected to the rim of the upper surface of the first laminate 110. The central region C partitioned by the spacer 120 may be formed at the center of the upper surface of the first laminate 110. The central region C may correspond to a recognition region capable of recognizing the contact location and the contact strength.

Similarly to the first laminate 110, the second laminate 130 is made of a material including the cross-aligned silver nanowires 1 and the contact location of the vertical axis of the first laminate 110 may be recognized with respect to the external contact, such as the writing tool. Here, the vertical axis may be expressed as a Y-axis direction in FIG. 22.

When the first laminate 110 and the second laminate 130 are made of silver nanowires and polyethylene terephthalate (PET), the first laminate 110 and the second laminate 130 may be transparent and may have a flexible property. Accordingly, the location recognition layer 100 including the first laminate 110 and the second laminate 130 may also be transparent and have the flexible property.

The horizontal and vertical axes refer to any one axis and the other axis perpendicular to the one axis, and may vary depending on a viewpoint and criteria and may be independent of the name.

The second laminate 130 is positioned on the first laminate 110 and the lower surface of the second laminate 130 is connected to the spacer 120, and as a result, the rim of the first laminate 110 and the rim of the second laminate 130 may be connected to each other through the spacer 120. Accordingly, the central region C of the first laminate 110 may be spaced apart from the lower surface of the second laminate 130.

Specifically, a pair of horizontal electrodes 111 are connected to the rim of the horizontal axis of the upper surface of the first laminate 110 and a pair of vertical electrodes 131 are connected to formed on the rim of a vertical axis of the lower surface of the second laminate 130, and the spacer 120 may include a horizontal section 121 located between the horizontal electrode 111 and the second laminate 130; and a vertical section 122 located between the vertical electrode 131 and the first laminate 110.

In order to recognize the contact location of the horizontal axis with respect to the external contact, the horizontal electrodes 111 are provided in a pair and are connected to both ends of the first laminate 110, specifically, the rim portion of the horizontal axis. The horizontal electrode 111 may be configured by a busbar. The horizontal electrode 111 may be formed to protrude upward from the upper surface of the first laminate 110 by being connected to the rim of the horizontal axis on the upper surface of the first laminate 110.

Similarly, in order to recognize the contact location of the vertical axis with respect to the external contact, the vertical electrodes 131 are provided in a pair and are connected to upper and lower ends of the second laminate 130, specifically, the rim portion of the vertical axis. The vertical electrode 131 may also be configured by the busbar. The vertical electrode 131 may be formed to protrude downward from the lower surface of the second laminate 130 by being connected to the rim of the vertical axis on the lower surface of the second laminate 130. The upward and the downward may be expressed by a Z axis in FIG. 22.

In this case, the spacer 120 disposed between the first laminate 110 and the second laminate 130 to separate the central region C may include the horizontal section 121 and the vertical section 122. One surface of the horizontal section 121 is connected to the upper surface of the horizontal electrode 111 and the other surface of the horizontal section 121 is connected to the lower surface of the second laminate 130 to prevent the horizontal electrode 111 and the second laminate 130 from directly contacting each other.

One surface of the vertical section 122 is connected to the lower surface of the vertical electrode 131 and the other surface of the vertical section 122 is connected to the upper surface of the first laminate 110 to prevent the vertical electrode 131 and the first laminate 110 from directly contacting each other.

More specifically, the side surfaces of the horizontal electrode 111 and the vertical electrode 131 may be coated with an insulating material to prevent the horizontal electrode 111 and the vertical electrode 131 from contacting with each other. This is because when the mutual contact is made with each other, it may interfere with the recognition of the contact location of the horizontal axis and the vertical axis.

When the force is applied to the touch screen panel from the outside through the writing tool, or the like, the central regions C of the second laminate 130 and the first laminate 110, which are spaced apart from each other, are brought into contact with each other, and as a result, the voltage change is made and the horizontal electrode 111 and the vertical electrode 131 recognize the horizontal axis and the vertical axis, respectively to recognize the contact location to which force is applied from the outside.

When the horizontal electrodes 111 and the vertical electrodes 131 are connected to a controller board 300 through wiring lines and the controller board 300 is connected to a display device 400 such as a computer to made the external contact through the writing tool, or the like, the contact location recognized through the controller board 300 may be implemented on the display device 400.

Specifically, a height from the upper surface of the first laminate 110 to the upper surface of the horizontal section 121 may be equal to the height from the lower surface of the second laminate 130 to the lower surface of the vertical section 122.

In FIG. 22, the height from the upper surface of the first laminate 110 to the upper surface of the horizontal section 121, which may be expressed by d1, may be formed to the height from the lower surface of the second laminate 130 to the lower surface of the vertical section 122, which may be expressed by d2, and as a result, the separation distances of the central regions of the second laminate 130 and the first laminate 110 may be formed to be the same as each other. The distance between the second laminate 130 and the central region C of the first laminate 110 is formed to be the same as the height from the upper surface of the first laminate 110 to the upper surface of the horizontal section 121 and the height from the lower surface of the second laminate 130 to the lower surface of the vertical section 122.

Specifically, the first laminate 110 may include a first film in which a plurality of silver nanowires 1 is arranged in a direction corresponding to the horizontal axis; and a second film laminated in the vertical direction with the first film, in which the plurality of silver nanowires 1 is arranged in a direction corresponding to the vertical axis and intersects with the silver nanowires 1 of the first film.

The first film may be formed such that the plurality of silver nanowires 1 is arranged with a certain directionality. As mentioned above, the silver nanowire 1 may be constituted by silver nanowires formed in a shape having a length of 15 to 35 μm and a diameter of 20 to 40 nm.

The longitudinal direction of the silver nanowires 1 constituting the first film may be arranged in the same direction as the direction in which the horizontal axis extends to constitute the first film.

The second film is connected with the first film in a form in which the first and second films are laminated on each other in the vertical direction. Similarly to the first film, the second film may be formed in the form in which the plurality of silver nanowires 1 is arranged with a certain directionality. The longitudinal direction of the silver nanowires 1 constituting the second film may be arranged in the same direction as the direction in which the vertical axis extends to constitute the second film.

The first film and the second film are not limited to a laminating order but may be laminated and connected in the vertical direction to form a top surface and a bottom surface.

Accordingly, the silver nanowires 1 of the first film are arranged in the same direction as the horizontal axis and the silver nanowires 1 of the second film are arranged in the same direction as the vertical axis, and as a result, the silver nanowires 1 of the first film and the silver nanowires 1 of the second film may be aligned in a form in which both silver nanowires 1 are orthogonal to each other.

Components of the first laminate 110 may include a substrate S, and the first film and the second film laminated on the substrate S and the components of the second laminate 130 may also be the same as those of the first laminate 110.

The first film and the second film are intended to just illustrate the laminated form of films including the silver nanowires crossing each other, but do not limit the number of films. A plurality of films may be laminated in the vertical direction until the first laminate 110 has desired sheet resistance and light transmittance.

Specifically, the plurality of silver nanowires 1 each have the longitudinal direction, and the alignment degrees of the first film and the second film are defined by Equation 2 below and may be ⅔ or more.

$$\text{Alignment degree} = [A]/([A]+[B])\quad\text{[Equation 2]}$$

([A] represents the number of silver nanowires whose longitudinal direction and arrangement direction show a difference of less than ±15° and [B] represents the number of silver nanowires whose the longitudinal direction and the arrangement direction show a difference of ±15° or more)

The alignment degree is a measure for indicating how uniformly the silver nanowires 1 constituting the first film or the second film are arranged.

When the silver nanowires 1 are randomly arranged, the silver nanowires 1 are unnecessarily entangled with each other, so that a film having high sheet resistance and surface roughness is formed and the electrical property and the optical property are not high, and as a result, the property of the film may be determined through the alignment degree.

As the alignment degree is higher, the network formed by silver nanowires 1 is well established, and as a result, the high electrical conductivity may be expressed and the sheet resistance may be low, and the high light transmittance may be expressed.

The alignment degrees of the first film and the second film according to the present invention may be ⅔ or more, and more specifically, may have a value of 0.7 or more.

A mechanochromic molecule may be composed of a spiropyran molecule, and the strength recognition layer may be composed of a spiropyran-PDMS complex molecule.

Specifically, the spiropyran molecule may be used as the mechanochromic molecule to be applied to the strength recognition layer 200, and may be formed of a SP-PDMS composite molecule together with polydimethylsiloxane (PDMS). Thus, the strength recognition layer 200 formed by the SP-PDMS composite molecule has properties that the strength recognition layer 200 is transparent and flexible. It is possible to configure a touch screen panel which is transparent and flexible and capable of recognizing the strength in combination with the location recognition layer 100 having the transparent property.

Referring to FIGS. 23 to 28, specifically, the strength recognition layer 200 may have an increased magnitude of the normalized luminance as the contact strength increases.

Figure 23:
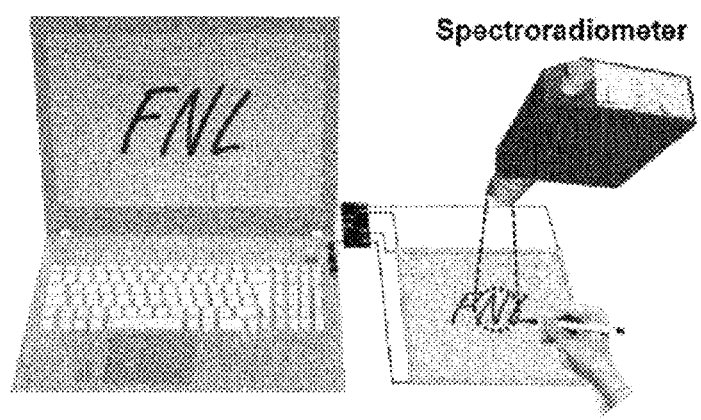
FIG. 23 is a diagram illustrating a shape of analyzing a color change shown in the touch screen panel by using a spectroradiometer according to the exemplary embodiment of the present invention.
Figure 24:
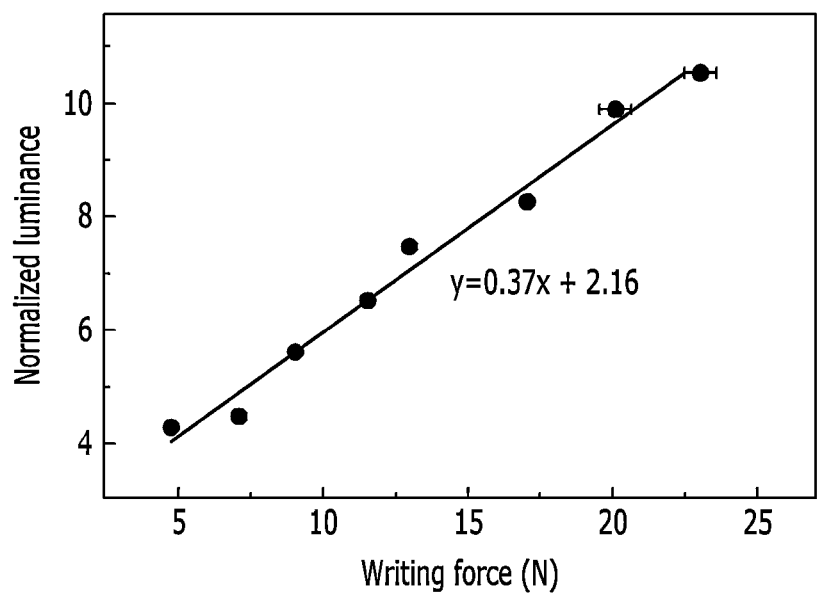
FIG. 24 is a graph showing a change in normalized luminance to a contact strength applied to the touch screen panel according to the exemplary embodiment of the present invention.

The contact strength applied to the strength recognition layer 200 appears as a blue change. As the contact strength increases, the blue color becomes darker. Such color change to blue may be analyzed by a spectroradiometer as illustrated in FIG. 23. The degree of darkness of blue may be quantified as the normalized luminance at 448 nm and the normalized luminance may increase as the contact strength applied to the strength recognition layer 200 increases. As illustrated in FIG. 24, the normalized luminance tends to increase linearly.

Figure 25:
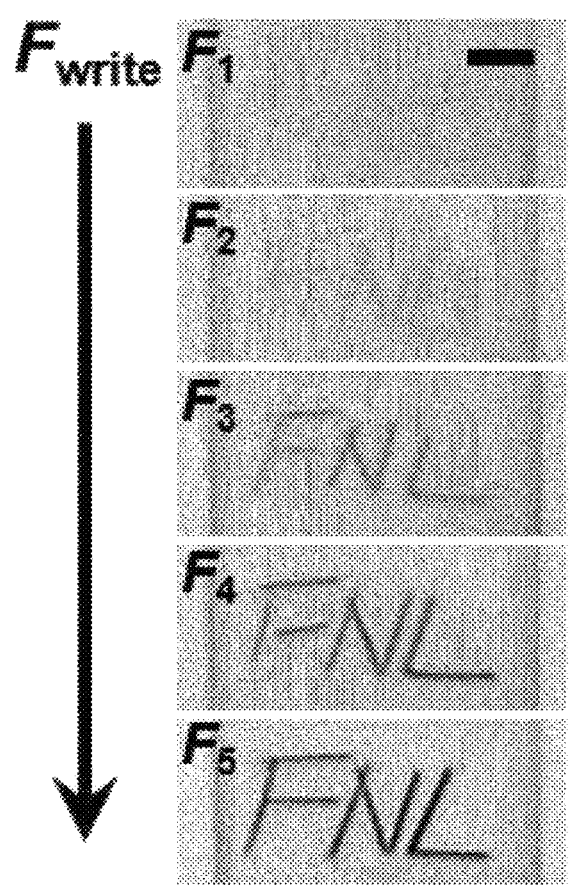
FIG. 25 is a photograph showing a mechanochromic color change depending on the contact strength applied to the touch screen panel according to the exemplary embodiment of the present invention.
Figure 26:
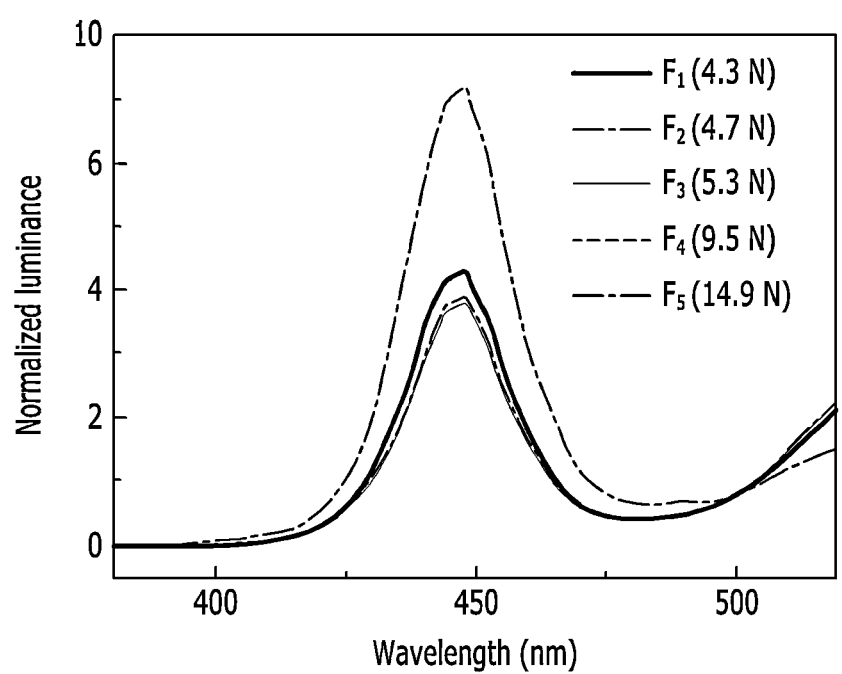
FIG. 26 is a spectrum of the normalized luminance of a blue character "FNL" in a visible range (380 to 520 nm) according to the exemplary embodiment of the present invention.

As can be seen in FIG. 25, the normalized luminance representing the degree of darkness of the blue according to the contact strength also changes, so that it is possible to reflect the force applied to the touch screen panel and display the changed luminance on a display. That is, in FIG. 25, the contact strength increases from F1 to F5. FIG. 26 illustrates a spectrum of the normalized luminance of a blue character "FNL" in a visible range (380 to 520 nm) according to an exemplary embodiment of the present invention.

Figure 27:
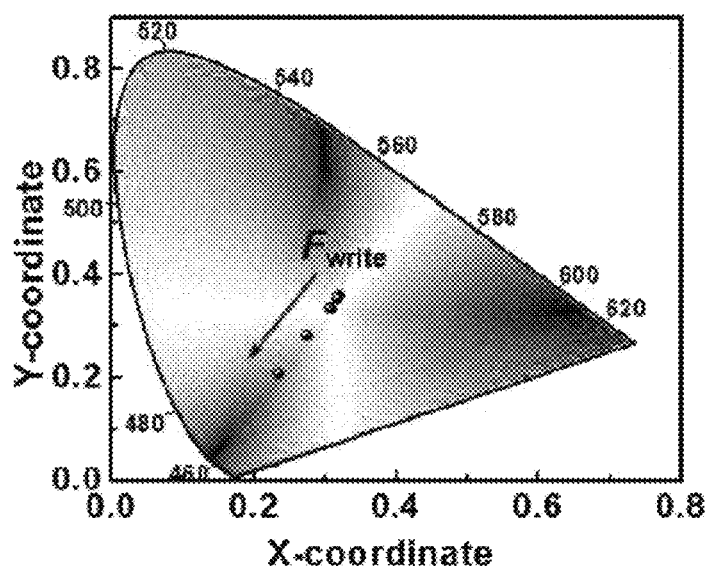
FIG. 27 is a color coordinate of a CIE 1931 color space with respect to the contact strength applied to the touch screen panel according to the exemplary embodiment of the present invention.
Figure 28:
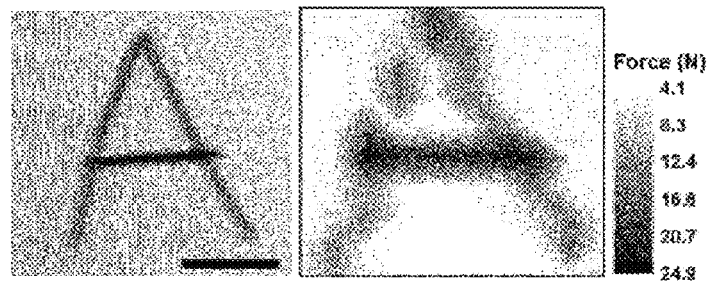
FIG. 28 illustrates a 10×10 pixel array of force mapping data for a character "A" written in the touch screen panel and the contact strength showing a local force distribution according to the exemplary embodiment of the present invention.

FIG. 27 is a color coordinate of the CIE 1931 color space with respect to the contact strength applied to the touch screen panel, and an X-Y coordinate shifts to a dark blue region in an arrow direction along with the increase of the applied force.

Method for Manufacturing Touch Screen Panel

A method for manufacturing a touch screen panel according to an exemplary embodiment of the present invention includes: a first step of moving a rod R wound with a metal coil (not shown) along an outer circumferential surface on a substrate S so as to form a film in which silver nanowires 1 are cross-aligned and laminating a plurality of films in a vertical direction to provide a location recognition layer 100; and a second step of laminating a strength recognition layer 200 for recognizing a contact strength through a change of a color, which includes a composite molecule in which mechanochromic molecules and PDMS molecules are coupled to an upper surface of the location recognition layer 100.

The first step is a step of manufacturing the location recognition layer 100 including the cross-aligned silver nanowires 1. A substrate S may be made of glass, silicon, polyethylene terephthalate (PET), or a combination thereof, but is not limited thereto. A rod R is moved on the substrate S to align the silver nanowires 1.

Specifically, surface treatment may be performed on the upper surface of the substrate S in order to improve the adhesion between the substrate S and the silver nanowires 1. More specifically, an amine, methyl, hydroxyl, or a functional group which is a combination thereof may be present on the upper surface of the substrate S. The methyl functional group may be formed by treating hexamethyldisilazane (HMDS), poly (methyl methacrylate) (PMMA), and mixtures thereof.

The hydroxyl functional group may be formed according to an $O_2$ plasma treatment. The amine functional group may be formed by treating polylaisine (PLL, Poly-L-Lysine), (3-Aminopropyl) triethoxysilane (APTES), and mixtures thereof.

In the presence of the amine functional group, strong attractive force acts between the positively charged substrate S and the negatively charged silver nanowire 1 to improve the alignment degree of the silver nanowire 1 and to improve the adhesion of the silver nanowires to the nanowires.

The metal coil is wound along the outer circumferential surface of the rod R, but guide grooves may be formed at regular intervals between the metal coils M and the interval of the guide grooves may be 50 to 400 μm.

The second step is a step of manufacturing a strength recognition layer 200 including a composite molecule in which mechanochromic molecules and polydimethylsiloxane (PDMS) molecules are combined and laminated on the upper surface of the location recognition layer 100. It will be replaced with the description of the strength recognition layer 200 described above. The first step and the second step are named to distinguish the respective steps, and may be regardless of the order.

More specifically, the first step may include an injection process of locating the rod R at a position spaced apart from the upper surface of the substrate S and injecting a dispersion containing the silver nanowires 1 between the rod R and the substrate S; and an alignment process of providing a film in which the silver nanowires 1 are aligned in a direction which is the same as a movement direction of the rod R through the guide grooves formed among the metal coils with horizontal movement of the rod R to have a predetermined arrangement direction.

After the injection process, the rod R is moved on the upper surface of the substrate S through the alignment process to provide the film on which the silver nanowires 1 are aligned. Capillary force may be imparted to the dispersion due to the presence of the guide groove formed between the metal coils M wound on the rod R. The dispersion may form a uniform meniscus between the rod R and the substrate S according to the capillary force.

Specifically, in the first step, the injection process and the alignment process are repeatedly performed in one set, and a film may be provided, in which a plurality of films having different arrangement directions by differentiating the horizontal movement direction of the rod R for each set is laminated in the vertical direction.

A single layer of film aligned in one direction is provided by performing a set of injection and alignment processes. Thereafter, a film in which multi-layered films are laminated may be prepared by repeatedly performing the injection process and the alignment process again on the upper surface of one layer of the film.

However, in the process of laminating the film on the upper surface of one layer of the film, the moving direction of the rod R in the previous set is different from the moving direction of the rod R in the next set. Therefore, the alignment direction of one layer of film and the alignment direction of the film of the next layer may be configured differently.

Therefore, it is possible to implement aligning the silver nanowires 1 constituting one layer of film and the silver nanowires 1 constituting the film of the next layer in the form of crossing each other. Specifically, the silver nanowires 1 constituting one layer of film and the silver nanowires 1 constituting the film of the next layer may be orthogonal to each other.

Figure 29:
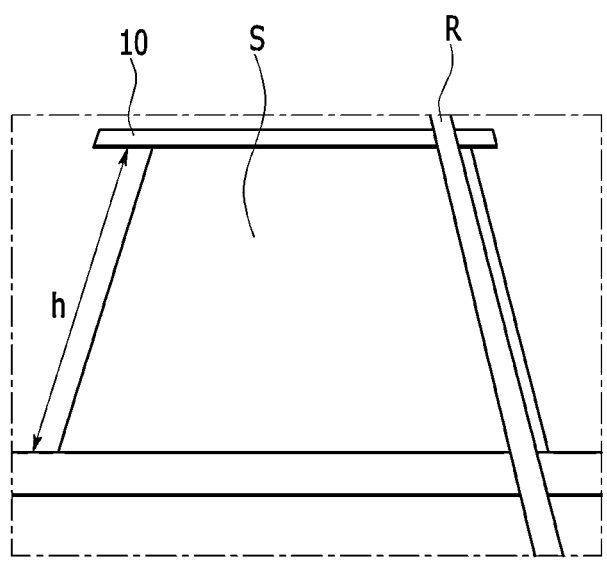
FIG. 29 is a diagram illustrating a method for manufacturing a touch screen panel using a separator according to an exemplary embodiment of the present invention.

Referring to FIG. 29, specifically, the manufacturing method may further include, before the injection process, a preparation process of separating a pair of tape-shaped separators 10 on the substrate S so as to be parallel to each other to set a separation distance between the substrate S and the rod R.

In the preparation process, the separator 10 is provided on the substrate S. The separators 10 may be configured in a pair and may be spaced apart in parallel with each other. The substrate S and the rod R may be spaced apart from each other by a height at which the separator 10 protrudes upward on the substrate S and thus the thickness of the film may be determined.

More specifically, in the preparation process, the distance that the pair of separators 10 are spaced apart from each other may be expressed by h as illustrated in FIG. 29, and as a result, a horizontal or vertical length of the film may be determined.

The thickness of the meniscus may be determined depending on the height of the separator 10 capable of determining the distance between the substrate S and the rod R.

The description of other properties will be given by substitutively describing the silver nanowire film and the method for manufacturing the same.

Specifically, the second step may include an application process of locating a bar at a location spaced apart from the upper surface of the location recognition layer 100 and applying a solution containing a composite molecule in which spiropyran molecules and PDMS molecules are coupled between the bar and the location recognition layer 100; and a lamination process of laminating the strength recognition layer 200 on the upper surface of the location recognition layer 100 with the horizontal movement of the bar.

The bar may have a rod shape of which the surface is smooth. In the application process, the bar is positioned at a position apart from the upper surface of the location recognition layer 100 formed after the first step. The thickness of the strength recognition layer 200 may be determined according to the spaced distance and can be formed from several hundred micrometers (m) to several millimeters (mm).

The solution may contain a composite molecule in which the spiropyran molecule and the PDMS molecule are coupled. The strength recognition layer 200 may be laminated by applying the solution between the bar and the location recognition layer 100 and horizontally moving the bar through the lamination process.

Accordingly, it is possible to form the strength recognition layer 200 having a very uniform surface, and such uniform surface formation may be very important in recognizing an accurate contact strength according to the force externally applied.

The present invention is not limited to the implementation examples and/or exemplary embodiments, but may be manufactured in various forms and those skilled in the art will understand that the present invention may be implemented in another specific form without changing the technical spirit or an essential feature thereof. Therefore, it should be appreciated that the aforementioned implementation examples and/or exemplary embodiments are illustrative in all aspects and are not restricted.

DESCRIPTION OF SYMBOLS

1: Metal nanowire
10: Separator
100: Location recognition layer
110: First film
111: Horizontal electrode
120: Spacer
121: Horizontal section
122: Vertical section
130: Second film
131: Vertical electrode
200: Strength recognition layer
300: Controller board

The invention claimed is:

1. A touch screen panel comprising:
  a location recognition layer including silver nanowires which are cross-aligned and that recognizes a contact location through a voltage change; and
  a strength recognition layer laminated on the top of the location recognition layer to contact the outside and including a composite molecule in which mechanochromic molecules and polydimethylsiloxane (PDMS) molecules are coupled to each other to recognize a contact strength through a change of a color, wherein the location recognition layer further includes:
  a first laminate including silver nanowires which are cross-aligned and that recognizes a contact location of a horizontal axis;
  a spacer connected along a rim of an upper surface of the first laminate to provide a central region partitioned by the rim; and
  a second laminate including silver nanowires which are cross-aligned and that is connected to the first laminate through the spacer and spaced apart from the central region and that recognizes the contact location of a vertical axis, wherein a pair of horizontal electrodes are connected to the rim of the horizontal axis of the upper surface of the first laminate and a pair of vertical electrodes are connected to formed on a rim of the vertical axis of a lower surface of the second laminate, and wherein the vertical electrodes are coated with an insulating material to prevent the horizontal electrodes and the vertical electrodes from contacting each other.

2. The touch screen panel of claim 1, wherein:
the spacer includes
a horizontal section located between the horizontal electrode and the second laminate, and
a vertical section located between the vertical electrode and the first laminate.

3. The touch screen panel of claim 2, wherein:
a height from the upper surface of the first laminate to the upper surface of the horizontal section is equal to the height from the lower surface of the second laminate to the lower surface of the vertical section.

4. The touch screen panel of claim 1, wherein:
the first laminate includes
a first film in which a plurality of silver nanowires is arranged in a direction corresponding to the horizontal axis, and
a second film laminated in the vertical direction with the first film, in which the plurality of silver nanowires is arranged in a direction corresponding to the vertical axis and intersects with the silver nanowires of the first film.

5. The touch screen panel of claim 4, wherein:
each of the plurality of silver nanowires has a longitudinal direction, and
the alignment degrees of the first film and the second film are defined by Equation 2 below and are ⅔ or more.

$$\text{Alignment degree}=[A]/([A]+[B]) \qquad [\text{Equation 2}]$$

([A] represents the number of silver nanowires whose longitudinal direction and arrangement direction show a difference therebetween, which is within ±150 and [B] represents the number of silver nanowires whose the longitudinal direction and the arrangement direction show a difference therebetween, which is ±15 or more).

6. The touch screen panel of claim 1, wherein:
a mechanochromic molecule is composed of a spiropyran molecule, and
the strength recognition layer is composed of a spiropyran-PDMS complex molecule.

7. The touch screen panel of claim 1, wherein:
the strength recognition layer
has an increased magnitude of the normalized luminance as the contact strength increases.

* * * * *